United States Patent
Mizuo

(10) Patent No.: US 9,748,880 B2
(45) Date of Patent: Aug. 29, 2017

(54) MOTOR CONTROL DEVICE AND MOTOR CONTROL METHOD

(71) Applicant: CANON KABUSHIKI KAISHA, Tokyo (JP)

(72) Inventor: Yoshihiro Mizuo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/074,242

(22) Filed: Mar. 18, 2016

(65) Prior Publication Data
US 2016/0285398 A1    Sep. 29, 2016

(30) Foreign Application Priority Data
Mar. 25, 2015    (JP) ................. 2015-062970

(51) Int. Cl.
| | |
|---|---|
| *G05B 19/40* | (2006.01) |
| *H02P 8/04* | (2006.01) |
| *H02P 8/10* | (2006.01) |
| *H02P 6/15* | (2016.01) |

(52) U.S. Cl.
CPC ............. *H02P 8/04* (2013.01); *H02P 6/15* (2016.02); *H02P 8/10* (2013.01)

(58) Field of Classification Search
CPC .......... G03G 15/2028; G03G 2215/20; G03G 15/0194; G03G 2215/0119; G05B 19/232; G05B 2219/45187; H02P 27/04; H02P 6/04; H02P 6/085; H02P 8/00; H02P 6/15; H02P 6/16; H02P 6/10; H02P 8/12; H02P 8/14
USPC .... 318/685, 560, 568.17, 651, 671, 606, 64, 318/65, 301, 384, 445, 696, 557, 567; 400/279, 285.5, 292, 315; 310/40 R, 310/49.01
See application file for complete search history.

(56) References Cited

U.S. PATENT DOCUMENTS

| | | | | | |
|---|---|---|---|---|---|
| 4,429,268 | A | * | 1/1984 | Yajima | ............. H02P 8/14 318/685 |
| 4,465,959 | A | * | 8/1984 | Yajima | ............. H02P 8/32 318/685 |
| 4,658,194 | A | * | 4/1987 | Richter | ............. H02P 8/14 318/685 |
| 6,555,985 | B1 | * | 4/2003 | Kawabata | ............. H02P 8/38 318/432 |

(Continued)

FOREIGN PATENT DOCUMENTS

| | | |
|---|---|---|
| JP | 2002-119089 A | 4/2002 |
| JP | 2014-045646 A | 3/2014 |

*Primary Examiner* — Rita Leykin
(74) *Attorney, Agent, or Firm* — Cowan, Liebowitz & Latman, P.C.

(57) ABSTRACT

A motor control unit having a motor structure that rotates a rotor by voltage excitation includes a photo interrupter, a slit rotation plate, a comparator, and an encoder circuit in order to obtain a position detection signal corresponding to a rotational phase of an output shaft. During a period of time from the motor stopping to the change of the output of an encoder circuit after the supply of a drive voltage waveform, a CPU supplies a drive voltage waveform that is advanced by an advance angle amount that has been set in advance to the motor, and after the change of the output of the encoder circuit, a drive signal by which the advance angle amount is controlled based on the output of the encoder circuit is supplied to the motor.

16 Claims, 28 Drawing Sheets

(56) References Cited

U.S. PATENT DOCUMENTS

| | | | | |
|---|---|---|---|---|
| 6,943,523 B2* | 9/2005 | Feres | ............... | H02P 8/14 |
| | | | | 318/41 |
| 7,038,404 B2* | 5/2006 | Kameyama | ........ | G03G 15/0194 |
| | | | | 318/34 |
| 7,332,887 B2* | 2/2008 | Ryuzaki | ............. | H04N 1/00519 |
| | | | | 318/600 |
| 7,369,786 B2* | 5/2008 | Nagasu | ............. | G03G 15/2028 |
| | | | | 399/18 |
| 7,568,778 B2* | 8/2009 | Terada | ................ | B41J 13/0027 |
| | | | | 318/280 |
| 7,642,739 B2* | 1/2010 | Muroi | ................ | G05B 19/232 |
| | | | | 318/609 |
| 7,860,627 B2* | 12/2010 | Horii | ................ | B60Q 1/12 |
| | | | | 362/36 |
| 7,862,246 B2* | 1/2011 | Terada | ................ | B41J 13/0027 |
| | | | | 318/280 |
| 8,111,032 B2* | 2/2012 | Nakane | ................ | B60K 37/02 |
| | | | | 318/463 |
| 9,225,273 B2* | 12/2015 | Sato | ................ | H02P 6/06 |
| 9,280,149 B2* | 3/2016 | Sugihara | ................ | G05B 19/19 |
| 2014/0035496 A1 | 2/2014 | Mizuo | | |

* cited by examiner

FORWARD ROTATION DIRECTION

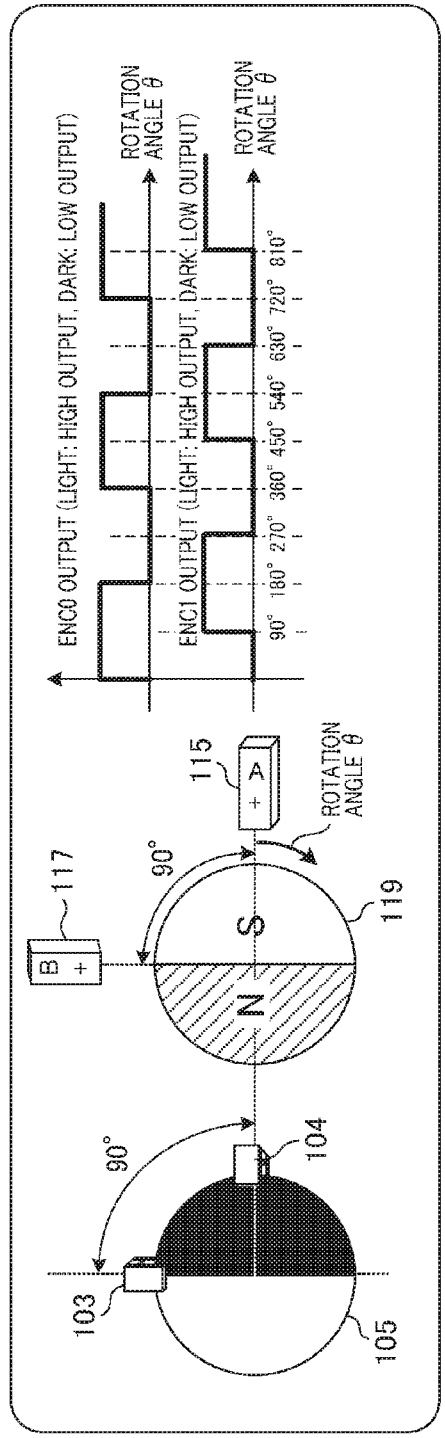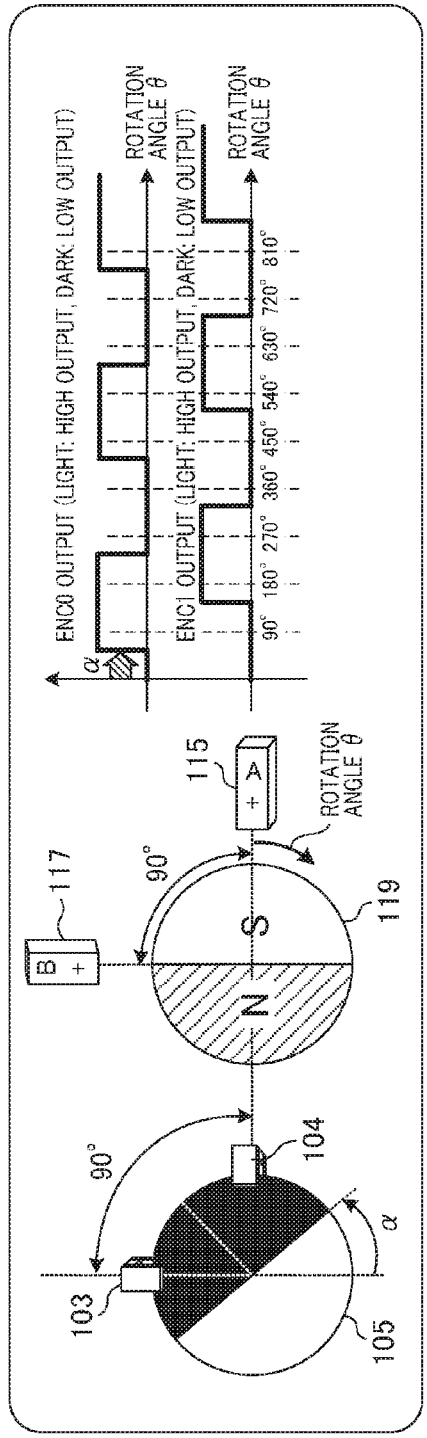

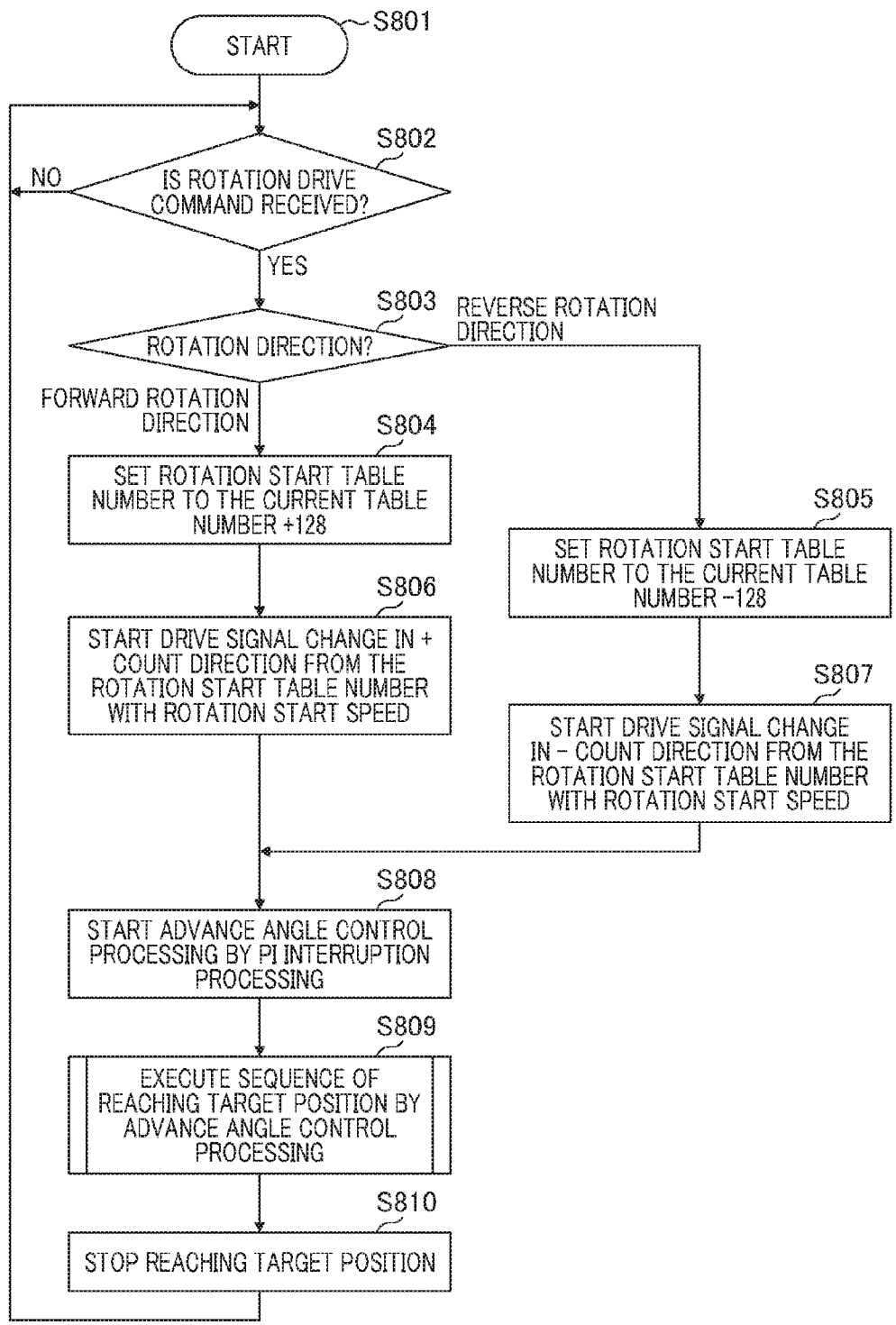

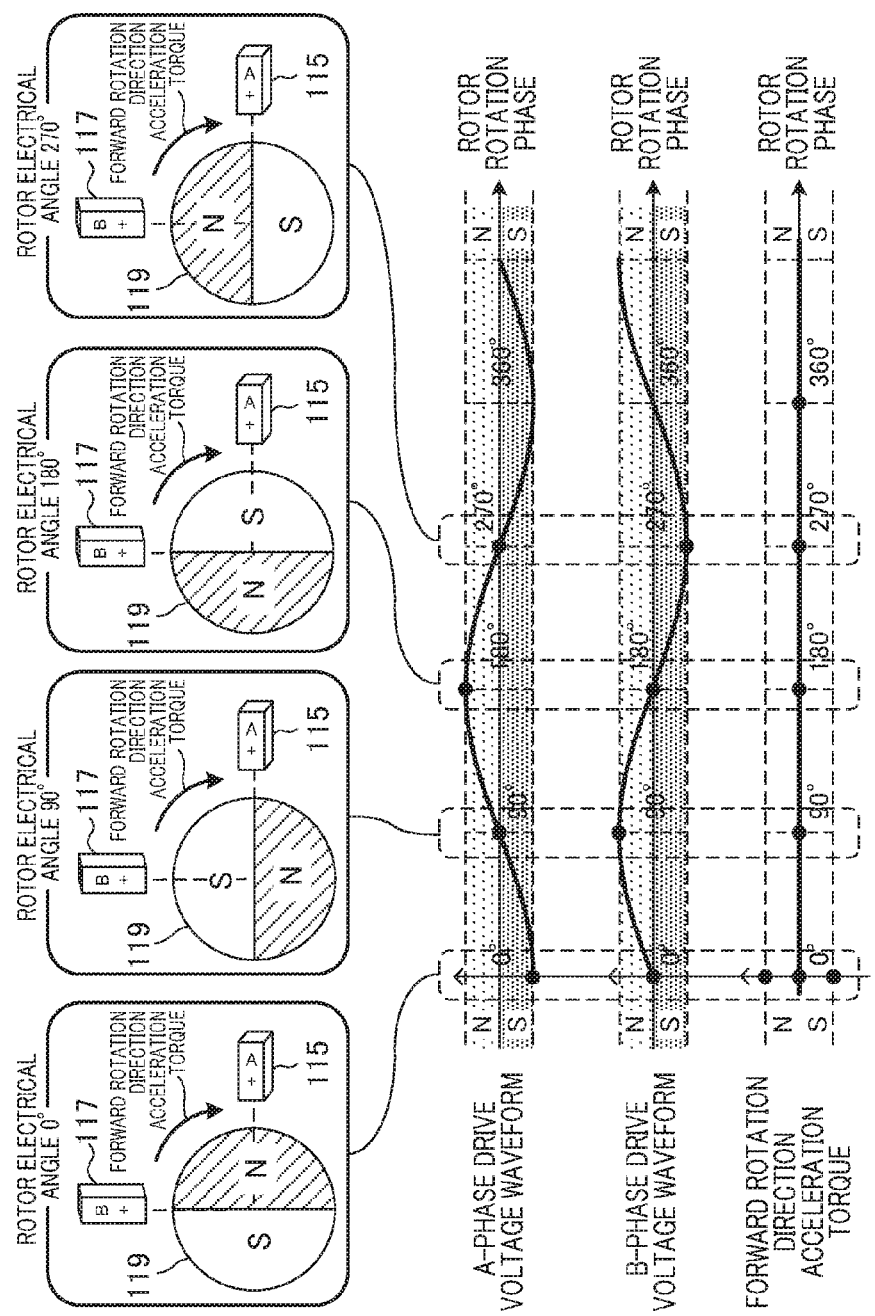

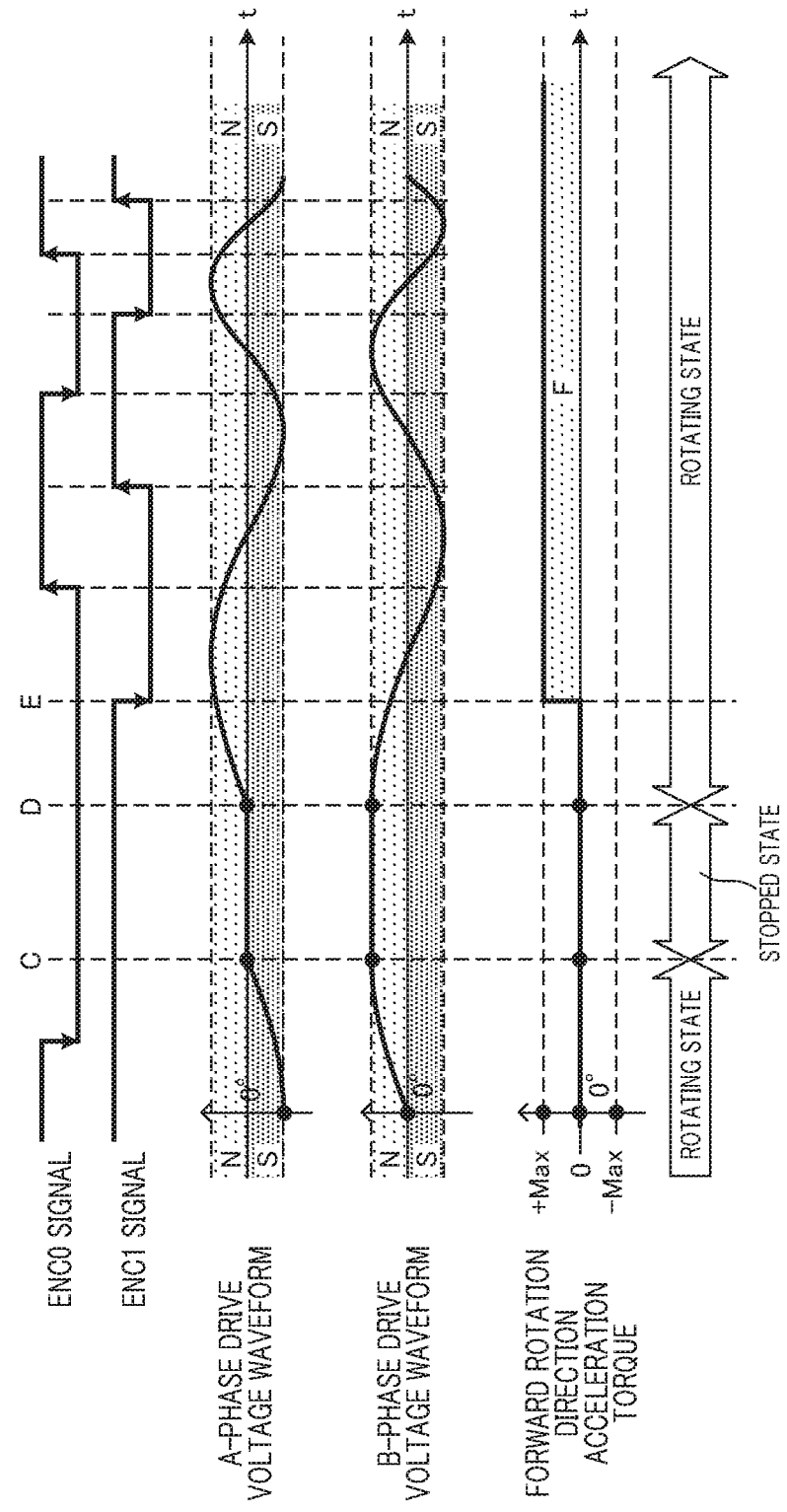

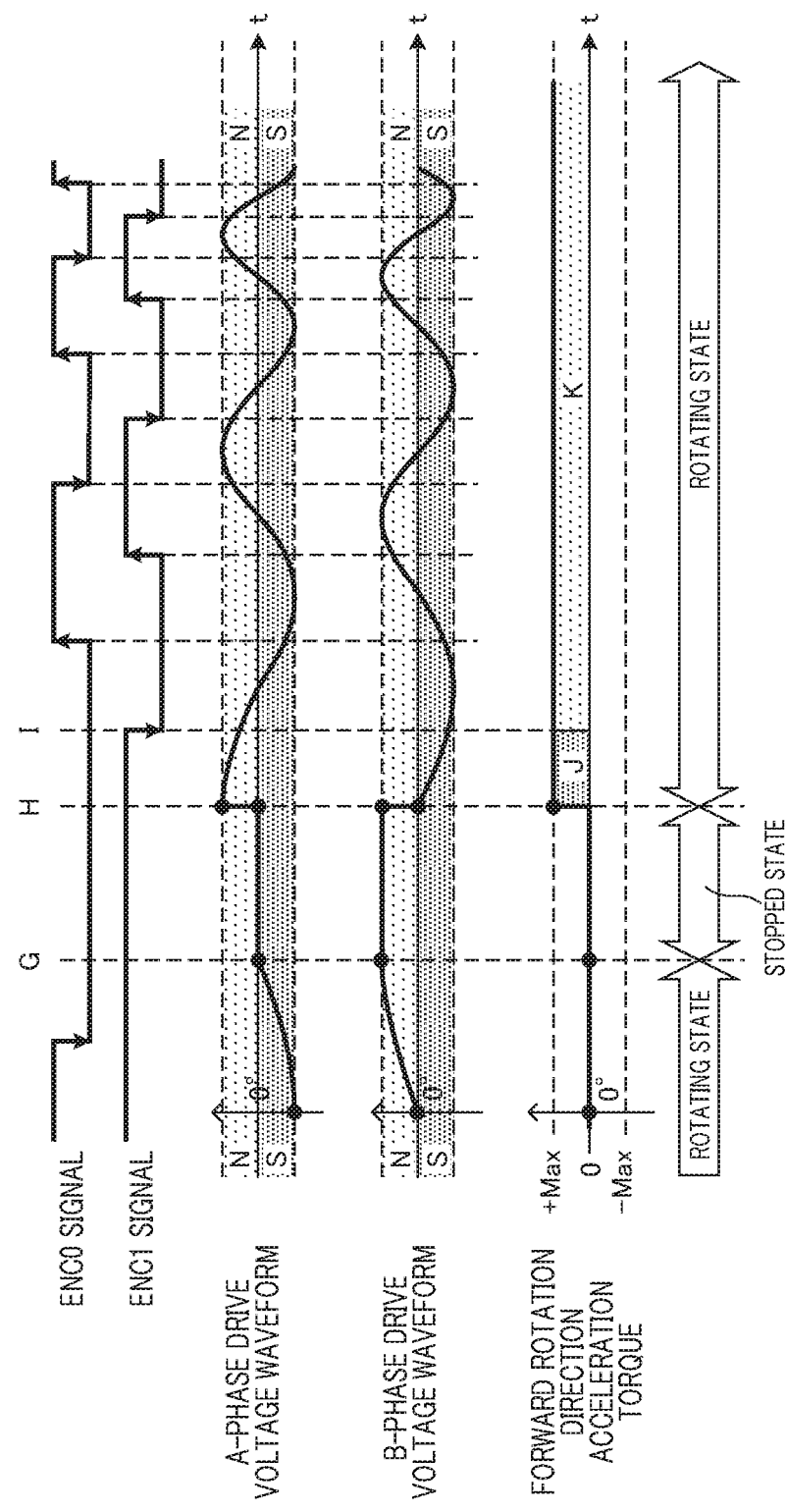

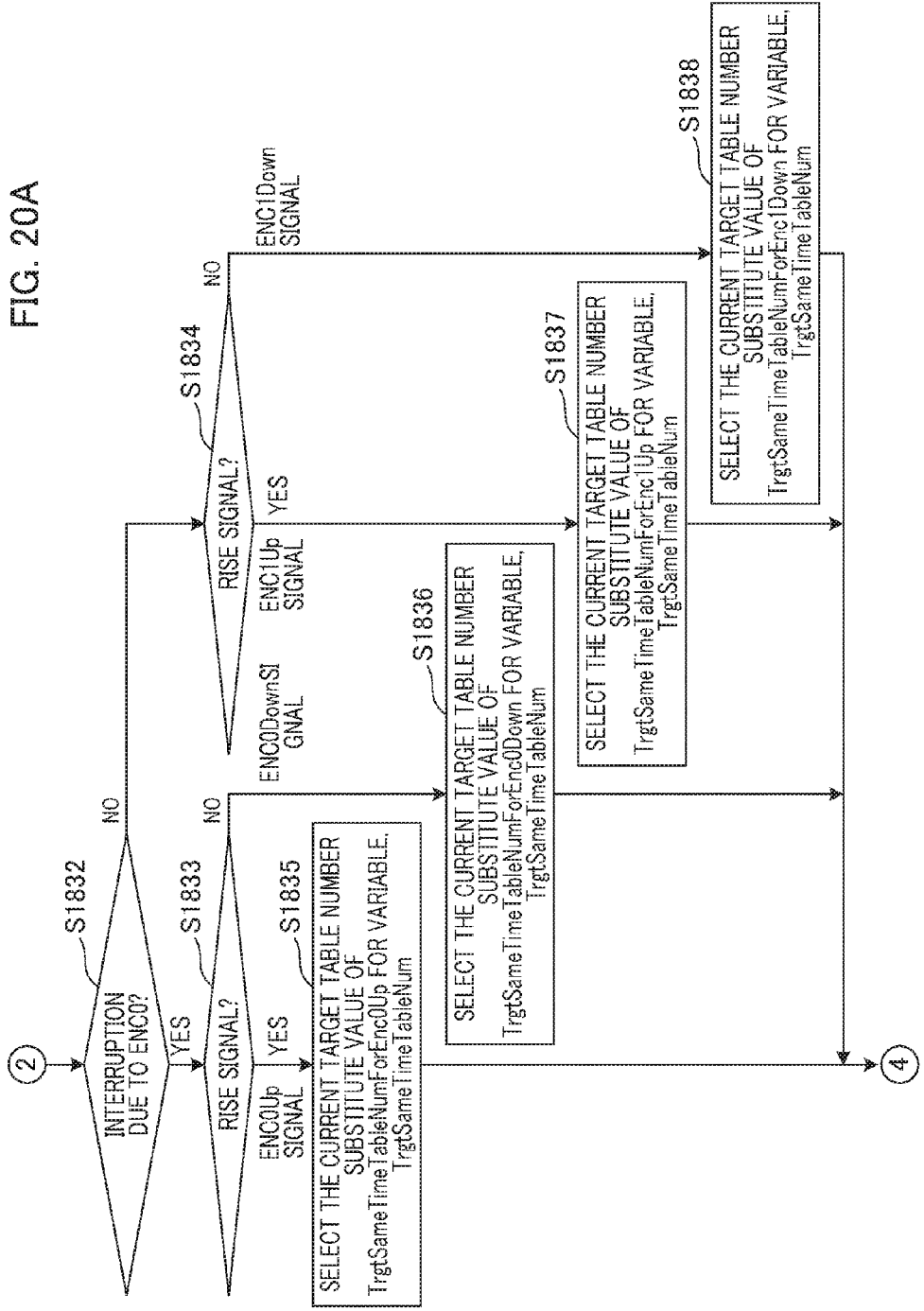

MOTOR CONTROL DEVICE AND MOTOR CONTROL METHOD

BACKGROUND OF THE INVENTION

Field of the Invention

The invention relates to a motor control device and a motor control method using a position detection signal, and more particularly, to control of the drive start of a motor.

Description of the Related Art

Stepping motors having characteristics of, for example, small size, high torque, long life are widely used in cameras, optical disk devices, printers, or projectors because they can easily perform digital positioning operation by open-loop control. As a solution to a large load on a motor or step-out upon a high-speed rotation, there is a method in which an encoder is attached to the stepping motor, energization is switched in accordance with the position of the rotor, and thereby, the operation of what is referred to as a "brushless DC motor" is performed.

Japanese Patent Application Laid-Open Publication No. 2002-119089 discloses a method for applying a rectangular wave-shaped drive waveform to the stepping motor, and Japanese Patent Application Laid-Open Publication 2014-045646 discloses a method for applying a sine wave-shaped drive waveform to the stepping motor. A high speed and high torque can be achieved while preventing step-out by effectively applying the drive waveform to a magnetization phase of the rotor, by using an encoder signal that is output in response to the rotation of the rotor.

In the prior art, before the encoder signal is detected, it is impossible to perform the operation equivalent to what is referred to as a "brushless DC motor" (hereinafter, referred to as "advance angle control"). Accordingly, between the drive start and the detection of the encoder signal, open drive of the stepping motor is performed. During the period of this open drive, the torque for acceleration is not applied, and if the length of the period affects the acceleration time, it takes a long time to start the operation.

SUMMARY OF THE INVENTION

In motor control using a position detection signal, the invention improves operation upon drive start and shortens acceleration time.

A device according to the invention is a motor control device that performs drive control of a motor, comprising: an obtaining unit that is configured to obtain a position detection signal by which the output periodically changes due to a movement of a movable element of the motor; and a control unit that is configured to supply a drive signal, by which an amount of an advance angle is controlled based on the position detection signal obtained by the obtaining unit, to the motor, wherein, during a period of time from the motor stopping to the change of the position detection signal obtained by the obtaining unit after the supply of the drive signal, the control unit supplies the drive signal that is advanced by the amount of the advance angle that has been set in advance to the motor, and after the position detection signal obtained by the obtaining unit changes, the control unit supplies a drive signal by which the amount of the advance angle is controlled based on the position detection signal to the motor.

According to the invention, in the motor control using a position detection signal, the operation upon the start of the drive is improved to enable shortening the acceleration time.

Further features of the invention will become apparent from the following description of exemplary embodiments (with reference to the attached drawings).

BRIEF DESCRIPTION OF THE DRAWINGS

FIGS. 6A and 6B are schematic diagrams illustrating the relation between a rotor magnet and the slit rotation plate.

FIG. 7 is a flowchart illustrating processing in a first embodiment of the invention.

FIGS. 8A and 8B are explanatory views of torque in the relation between a rotor phase and a drive waveforms phase in the first embodiment.

FIGS. 9A and 9B are diagrams illustrating a drive waveform, an encoder signal waveform, and the torque in the first embodiment.

FIGS. 20A and 20B are flowcharts illustrating processing subsequent to FIG. 19.

DESCRIPTION OF THE EMBODIMENTS

Hereinafter, a detailed description will be given of embodiments of the invention with reference to the accompanying drawings. After explaining a configuration and operation common to each embodiment, each embodiment will be described. Note that, in each embodiment, although a motor control device and a motor control method will be explained by illustrating a rotation drive motor in which a movable element rotates due to voltage excitation, the invention is also applicable to a linear drive motor in which the movable element linearly moves in the moving direction.

Figure 1A:
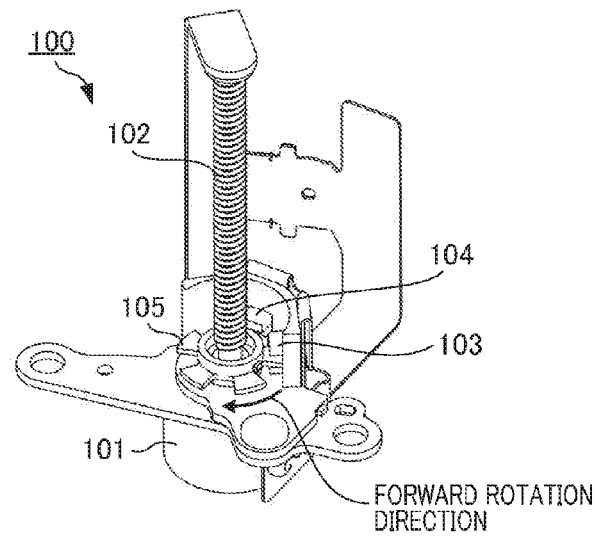
FIG. 1A is a diagram illustrating a motor unit in an embodiment of the invention.

FIG. 1A is an external view of a motor unit 100 according to an embodiment of the invention. The motor unit 100 includes a stepping motor (hereinafter, simply referred to as a "motor") 101, and an output shaft 102 that has a slit rotation plate 105. The slit rotation plate 105, which is a portion to be detected, is designed such that the ratio of a light region to a dark region is 50:50. As a pair of optical detection means that optically detects the light region and the dark region with respect to the slit rotation plate 105, a ch0 photo interrupter 103 and a ch1 photo interrupter 104 are attached. The slit rotation plate 105 rotates in accordance with the rotation of the output shaft 102 and the output signal of each photo interrupter (referred to as "PI") changes. The output shaft 102 is attached to the rotational center of a rotor magnet 119 as a movable element. Position information corresponding to the position of the rotor magnet 119 can be obtained from the output signal of the ch0 photo interrupter 103 and the ch1 photo interrupter 104. Thus, the ch0 photo interrupter 103 and the ch1 photo interrupter 104 are an example of a position information obtaining means. Hereinafter, the ch0 photo interrupter is referred to as "ch0-PI", and the ch1 photo interrupter is referred to as "ch1-PI", and these are used for the detection of the rotation position of the output shaft.

Figure 1B:
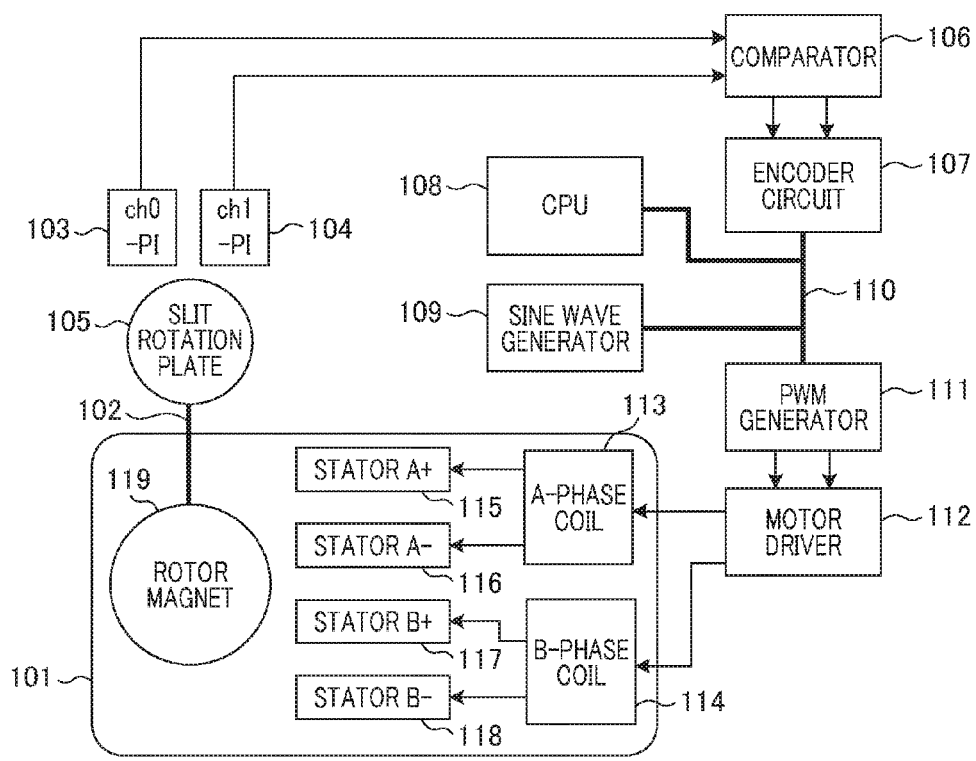
FIG. 1B is a diagram illustrating an outline of a system configuration in the embodiment of the invention.

FIG. 1B illustrates a configuration example of a system including an electric circuit for drive. Each portion shown by reference numerals 101 to 105 are as described above. A comparator 106 compares each analog input signal from the ch0-PI 103 and the ch1-PI 104 with a threshold voltage that has been set, and outputs a binarized signal to an encoder circuit 107. In the embodiment of the invention, a threshold has been adjusted in advance such that H (HIGH) level to L (LOW) level of the comparator 106 is 50:50 in a state in which the motor is rotating at a constant speed without irregularity in rotation. Hereinafter, a first detection signal obtained by binarizing the signal of the ch0-PI 103 serves as an ENC0 signal, and a second detection signal obtained by binarizing the signal of the ch1-PI 104 serves as an ENC1 signal. The encoder circuit 107 obtains timing information upon the change of each signal of the ENC0 signal and the ENC1 signal, and performs position count and signal cycle count by each signal. In encoding processing by the encoder circuit 107, four types of signals, that is, the rise and fall of the ENC0 signal and the rise and fall of the ENC1 signal, are distinguished, and interruption is applied to a CPU (central processing unit) 108 at each input timing of the signals. At this time, the CPU 108 identifies four types of the signals related to a cause of interruption. The CPU 108 has a function that reads out a program from a memory and executes it, and accesses the encoder circuit 107, a sine wave generator 109, a PWM (Pulse Width Modulation) generator 111 via a bus 110. The sine wave generator 109 has a reference table of multi-valued waveform data having 512 resolutions for one cycle of the sine wave. When the sine wave generator 109 transmits a signal of a PWM value corresponding to a table value of the multi-valued waveform to the PWM generator 111, a PWM signal output from the PWM generator 111 is amplified by a motor driver 112 and supplied to the stepping motor 101. The details about signal transmission from the sine wave generator 109 to the motor 101 will be described below with reference to FIG. 2 and FIG. 4.

Next, the structure of the H-bridge motor driver 112 will be described below with reference to the schematic diagram of FIG. 2. In a graph A in FIG. 2, an A-phase coil 113 is connected through switching elements 401 to 404. As shown in a graph B in FIG. 2, when the A-phase PWM signal from the PWM generator 111 is a HIGH signal (hereinafter, referred to as "H signal"), the switching elements 401 and 404 are in a closed state and the switch elements 402 and 403 are in an open state. At this time, a potential difference by the voltage Vcc supplied to the motor driver 112, where the A-side serves as a high potential, occurs at both ends of the A-phase coil 113. The potential of the A side of the coil 113 with respect to the B side thereof at this time is shown in a graph F in FIG. 2, and a flowing current "I" is shown in a graph I in FIG. 2.

When the A-phase PWM signal from the PWM generator 111 is a LOW signal (hereinafter, referred to as "L signal"), the switching elements 402 and 403 are in an open state and the switching elements 401 and 404 are in a closed state, as shown in a graph C in FIG. 2. At this time, a potential difference by the voltage Vcc supplied to the motor driver 112, where the B-side serves as a high potential, occurs at both ends of the A-phase coil 113. The potential of the A side of the A-phase coil 113 with respect to the B side thereof at this time is shown in a graph G in FIG. 2, and a flowing current "−I" is shown in a graph J in FIG. 2.

Figure 2:
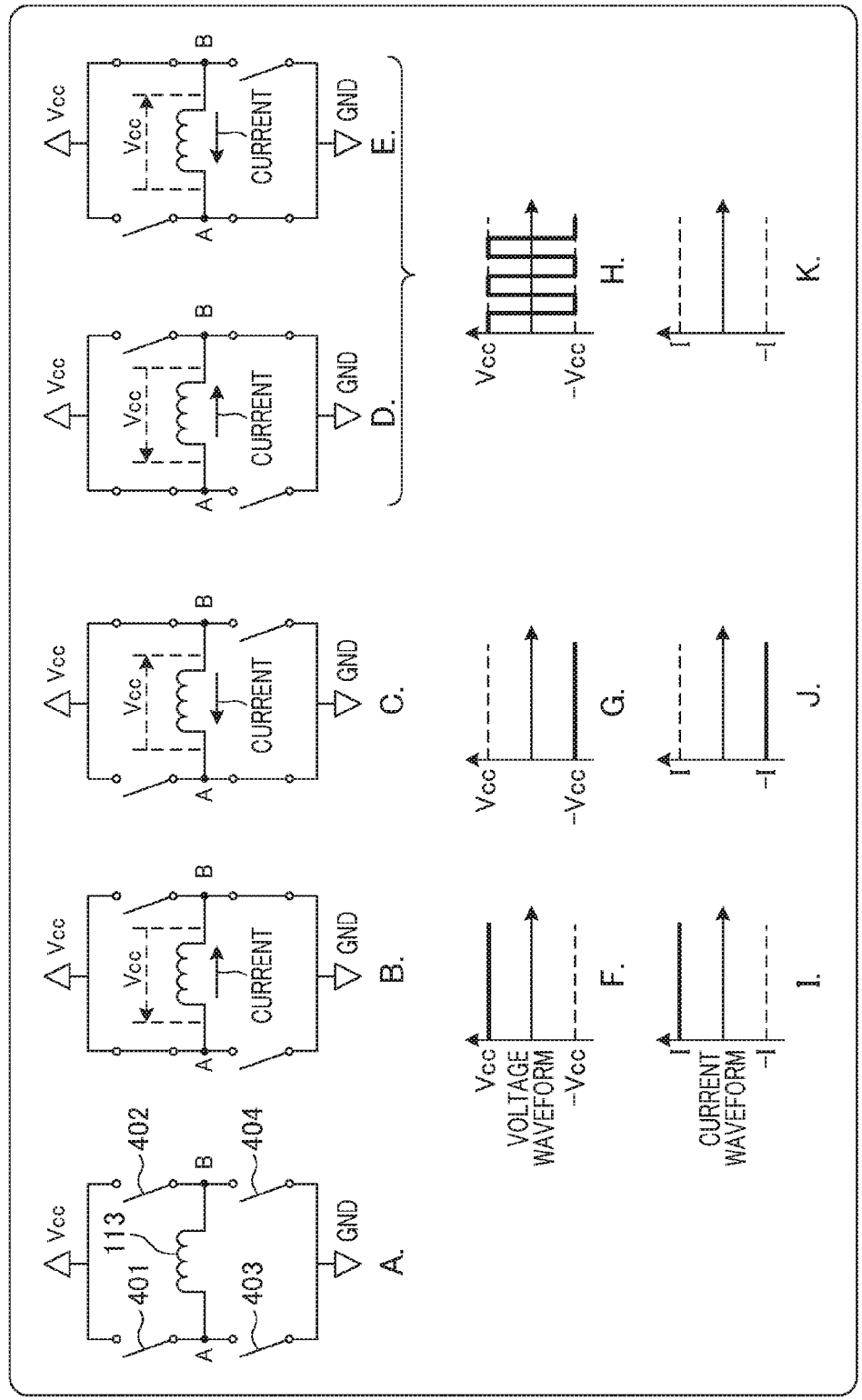
FIG. 2 is an explanatory view of the operation of a motor driver.

An example for the case in which the two states described above are repeated in a short period of time is shown in the graphs D, E, H, and K in FIG. 2. Repeating the states in the graphs D and E in FIG. 2 at equal intervals generates binary rectangular-wave voltage signals of −Vcc and +Vcc, as shown in the graph H in FIG. 2. When this voltage signal is applied to the A-phase coil 113, a current waveform appears in a manner in which a voltage signal is smoothed by a current delay component of the coil. If the HL signal ratio of −Vcc and +Vcc is 50%, the effective current value becomes 0. Accordingly, it can be effectively treated as the same as the case in which the stationary voltage of 0V in output when the signal ratio of the PWM signal to the HL signal is 50% is applied, the stationary voltage of +Vcc when the ratio is 100% is applied, or the stationary voltage of +Vcc/2 when the ratio is 75% is applied.

Figure 4:
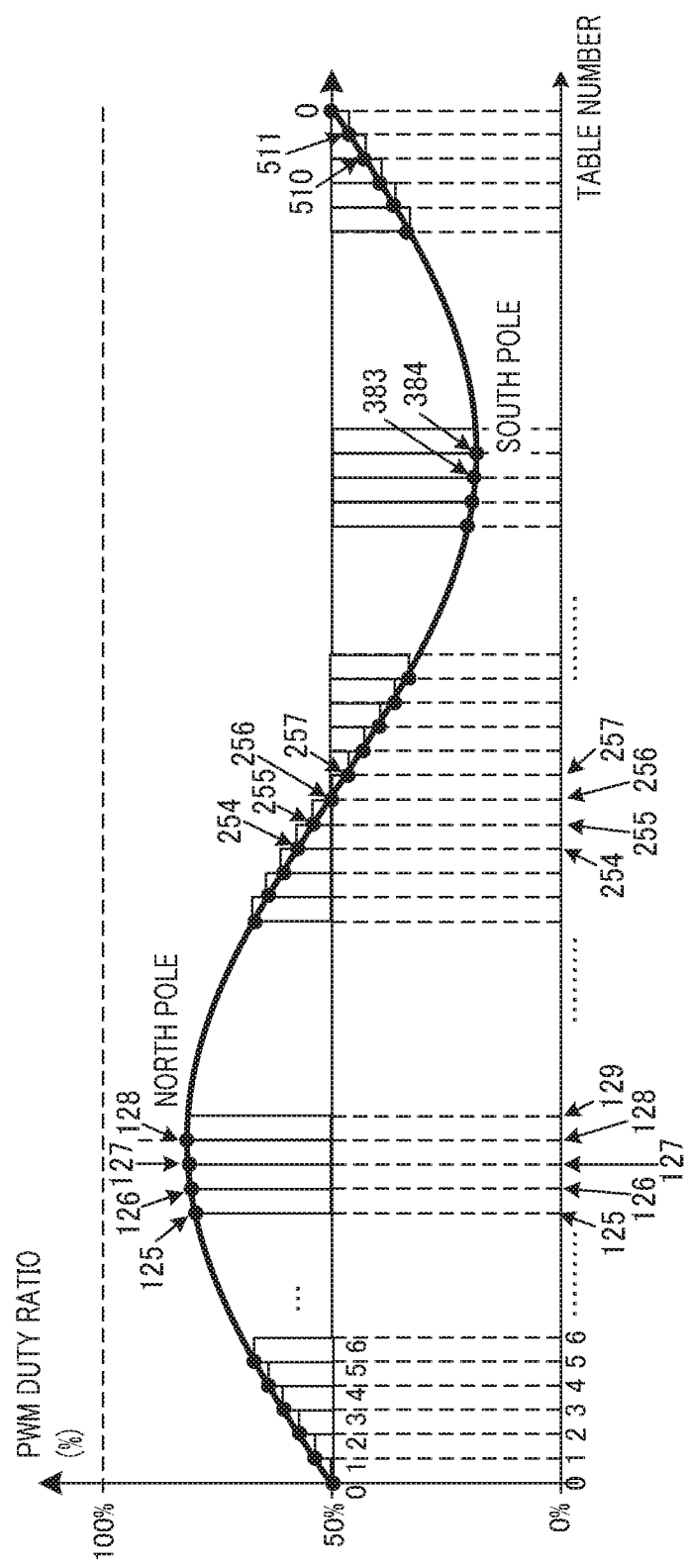
FIG. 4 is an explanatory view of the output of the sine wave generator.

In the sine wave generator 109, for each of 512 table numbers, the value of DUTY ratio (%) of PWM control is stored in the reference table. FIG. 4 illustrates the reference table of the sine wave, and the table numbers from 0 to 511 correspond to the phase values of the sine wave. Table number 0 corresponds to the 0 degrees phase of the sine wave, and table number 256 corresponds to the 180 degrees phase of the sine wave. The value of 50% in the DUTY ratio is stored in table number 0, and in the subsequent table numbers, the values of the DUTY ratio of the PWM output are stored in accordance with the phase. In the example of FIG. 4, the value of +Vcc is output when the value of the DUTY ratio reaches 100%, and thus the peak of the table value is set to a value less than 100% so as to allow changing the gain of the sine wave at any time. By the above method, it is possible to effectively apply the sine wave-shaped voltage signal to the motor coil by a binary output signal which has been digitized. Hereinafter, for convenience of explanation, a drive voltage is treated as a sine wave.

A sine wave drive voltage (drive signal) that is output from the motor driver 112 is supplied to the A-phase coil 113 and a B-phase coil 114 shown in the graphs A to K in FIG.

2. Four types of sine wave drive voltages that are different in phase are generated for a stator A+ 115, a stator A− 116, a stator B+ 117, and a stator B− 118 described below. The drive voltage waveforms in the A-phase and the B-phase, a stator application voltage, the stop position of the rotor, and the position of the slit rotation plate 105 at that time will be described in detail with reference to FIG. 3A to FIG. 5B.

Figure 3B:
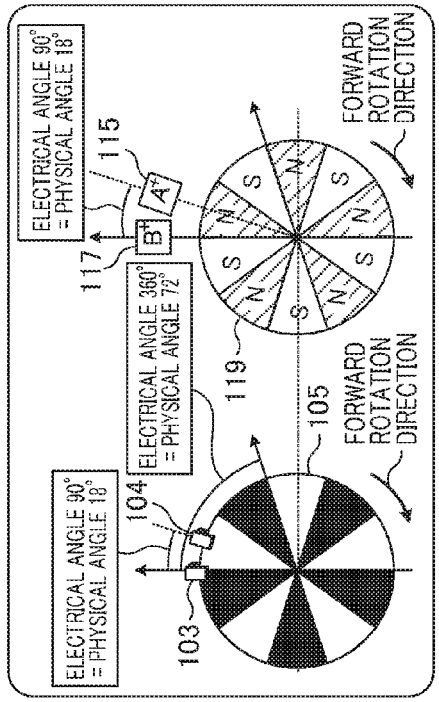
FIGS. 3A to 3C are diagrams illustrating the positional relation between a motor, a stator, and a slit rotation plate.
Figure 3C:
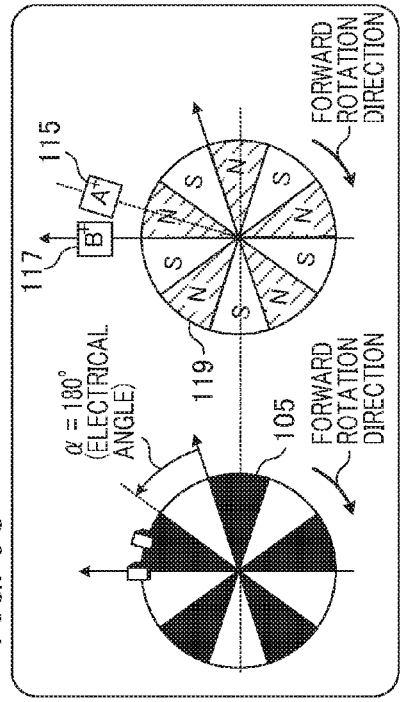
Figure 3A:
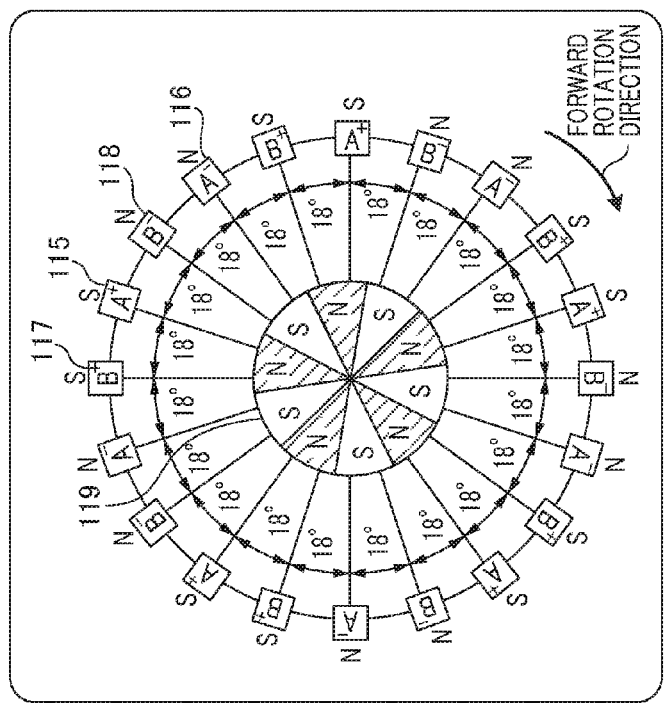

FIG. 3A is a schematic diagram illustrating an internal structure of the motor 101. The number of pole pairs of the rotor magnet 119 is 5 (10-pole) and the stators are disposed at intervals of 18 degrees each in the physical angle around the rotor magnet 119. The clockwise direction serves as a forward rotation direction (first direction). The stator A+ 115, the stator A− 116, the stator B+ 117, and the stator B− 118 are periodically arranged around the motor shaft. The stator A+ 115 and the stator B+ 117 generate a magnetic force of the north pole when the voltage applied to the coil is in the positive range of the sine wave. Additionally, the stator A− 116 and the stator B− 118 generate a magnetic force of the south pole when the voltage applied to the coil is in the positive range of the sine wave. In FIG. 4, the north pole is shown in the positive region of the sine wave and the south pole is shown in the negative region, which indicate the generated magnetic force to the stator A+ 115 and the stator B+ 117. The stator A− 116 and the stator B− 118 are the relation opposite to that of the stator A+ 115 and the stator B+ 117.

Figure 5A:
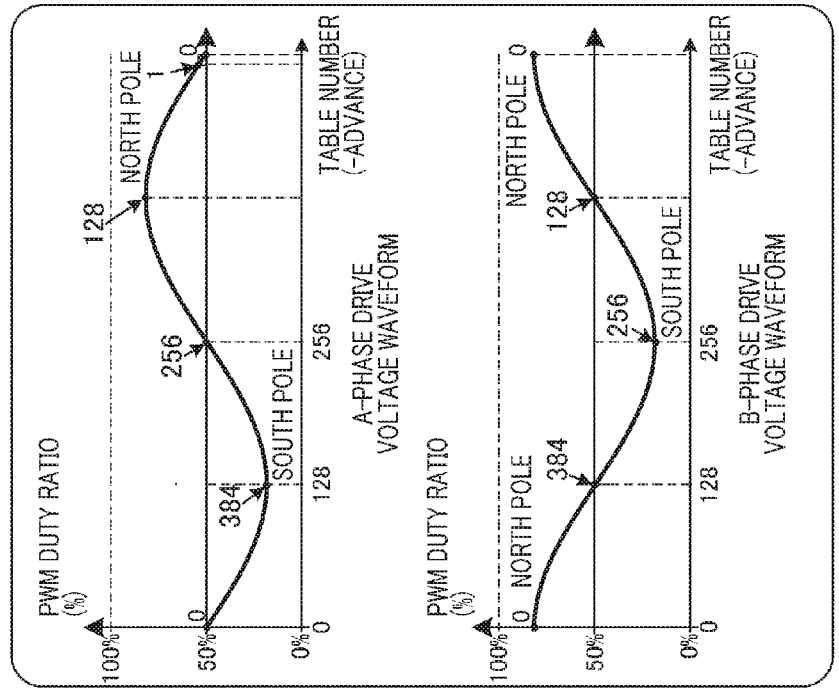
FIGS. 5A and 5B are explanatory views of a sine wave-shaped drive waveform.
Figure 5B:
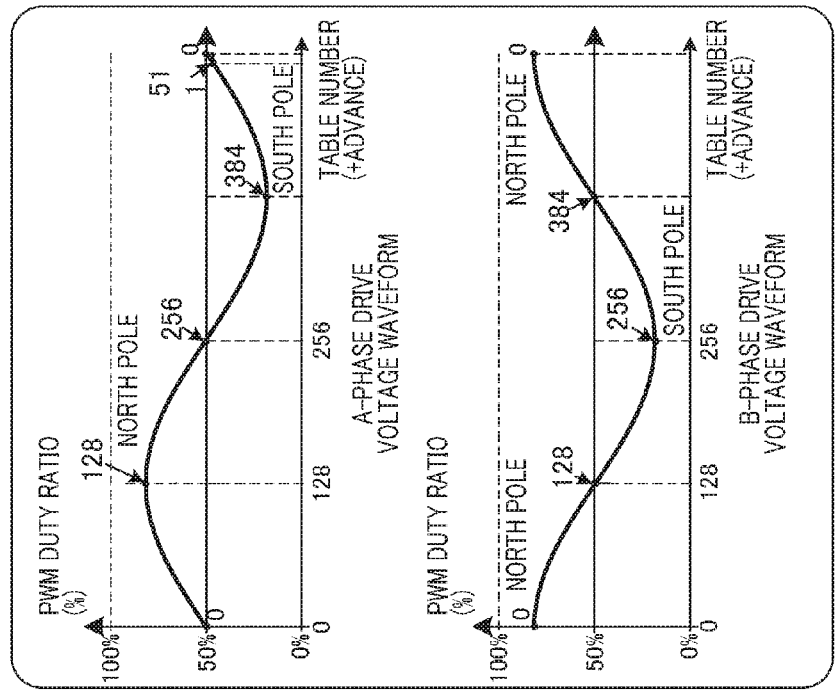

FIGS. 5A and 5B illustrate drive voltage waveforms of each phase. If the Sin (sine wave) wave signal shown in FIG. 5A is applied to the A-phase coil and Cos (cosine) wave signal is applied to the B-phase coil, the output shaft 102 rotates in the forward rotation direction shown in FIGS. 1A and 1B and FIGS. 3A to 3C. During the forward rotation, the table number is advanced in the positive direction, the drive waveform signal is generated, and the waveform at which the phase B advances at 90 degrees to the phase A is output. Additionally, when the signals shown in FIG. 5B are applied to the A-phase coil and the B-phase coil respectively, the output shaft 102 rotates in a second direction (reverse direction) that is opposite to the forward rotation direction shown in FIGS. 1A and 1B and FIGS. 3A to 3C. During the reverse rotation, the table number is advanced in the reverse direction, the drive waveform signal is generated, and the waveform in which the phase B is delayed at 90 degrees to the phase A is output.

FIG. 3B illustrates the positional relation between each stator and photo interrupter and the phase relation between the magnetization phase of the rotor magnet 119 and the reference position of the slit rotation plate 105. The positional relation in which the north pole region of the rotor magnet 119 and the light region of the slit rotation plate 105 are exactly overlapped is set as a reference positional relation. In FIG. 3C, based on the reference positional relation, a case in which the slit rotation plate 105 is fixed to the position shifted at α degree electrical angle (180 degrees in the drawing) in the reverse rotation direction is shown. The electrical angle is an angle in which a phase angle of the sine wave applied to the rotor and an angle in which the rotor magnet 119 advances at that time are re-defined as 360 degrees. Thus, in the case of the present embodiment, the physical angle of 72 degrees between the slit rotation plate 105 and the rotor magnet 119 corresponds to the electrical angle of 360 degrees. There are cases in which the slit rotation plate 105 is attached in a state in which the light and dark phases thereof shift with respect to the magnetization phase of the rotor magnet 119. In the present embodiment, the value of α has been calculated in advance. For example, if the motor is open-driven in the forward rotation direction, a first phase difference between the position detection signal and the magnetization phase for the motor shaft is calculated, and if the motor is open-driven in the reverse rotation direction, a second phase difference between the position detection signal and the magnetization phase for the motor shaft is calculated. The value of the electrical angle α indicating the phase shift amount can be specified by dividing the sum of the first phase difference and the second phase difference in 2.

FIG. 3B illustrates the physical position of the stator A+ 115, the stator B+ 117, the ch0-PI 103, and the ch1-PI 104. Actually, although there are 20 stators as shown in FIG. 3A, the position of the stator A+ 115 and the stator B+ 117 are shown as serving to represent them. The stator B+ 117 is located away from the stator A+ 115 at the physical angle of 18 degrees in the reverse rotation direction. From the viewpoint of the angle, the ch0-PI 103 is disposed so as to be a position corresponding to the stator B+ 117, and the ch1-PI 104 is disposed so as to be a position corresponding to the stator A+ 115.

FIGS. 6A and 6B illustrate diagrams that simplify the number of pole pairs "5" to the model of the configuration, the number of pole pairs "1". Accordingly, the electrical angle and the physical angle are coincident, and the following description will be made with this model. FIG. 6A illustrates a case in which the magnetization phase of the rotor magnet 119 and the light and dark phases of the slit rotation plate 105 are in the reference positional relation. Waveforms at the right in FIG. 6A indicates an output change of the ENC0 signal and the ENC1 signal if the rotation position is rotated at θ degrees from the state in the drawing. In contrast to FIG. 6A, FIG. 6B illustrates a case in which the slit rotation plate 105 is attached after shifting by an electrical angle α in the reverse rotation direction. At this time, each output of the ENC0 signal and the ENC1 signal is output behind the electrical angle α min., as compared with the case of FIG. 6A.

[First Embodiment]

A first embodiment of the invention will be described below. A description will be given with reference to the flowchart of FIG. 7 illustrating a flow of process in the present embodiment. The CPU 108 reads out a program from the memory and executes it, to realize thereby the present process.

First, process starts in S801, and in the subsequent S802, the CPU 108 determines whether or not a rotation drive command to the motor has been received in the motor control device. If the rotation drive command has been received, the process proceeds to S803, and if it has not been received, the process of S802 is repeated to be in a standby state. In S803, the rotation direction of the motor is determined by a comparison between the target position by the rotation drive command and the current position. The process proceeds to S804 if the rotational direction of the motor is the forward rotation direction, and the process shifts to S805 if the rotational direction of the motor is the reverse rotation direction.

In S804, the CPU 108 changes the current table number to a value obtained by adding 128 to the table number that is output at the current stop position. In the subsequent S806, control starts that advances the table number in a + (plus) count direction from the rotation start position with a frequency corresponding to the rotation start speed received by the rotation drive command. Desirably, the time from S804 to S806 is as short as possible, or substantially simultaneous. A description will be given of the reason for advancing by adding 128 to the table number in S804 with reference to FIGS. 8A and 8B, and FIGS. 9A and 9B.

Figure 8B:
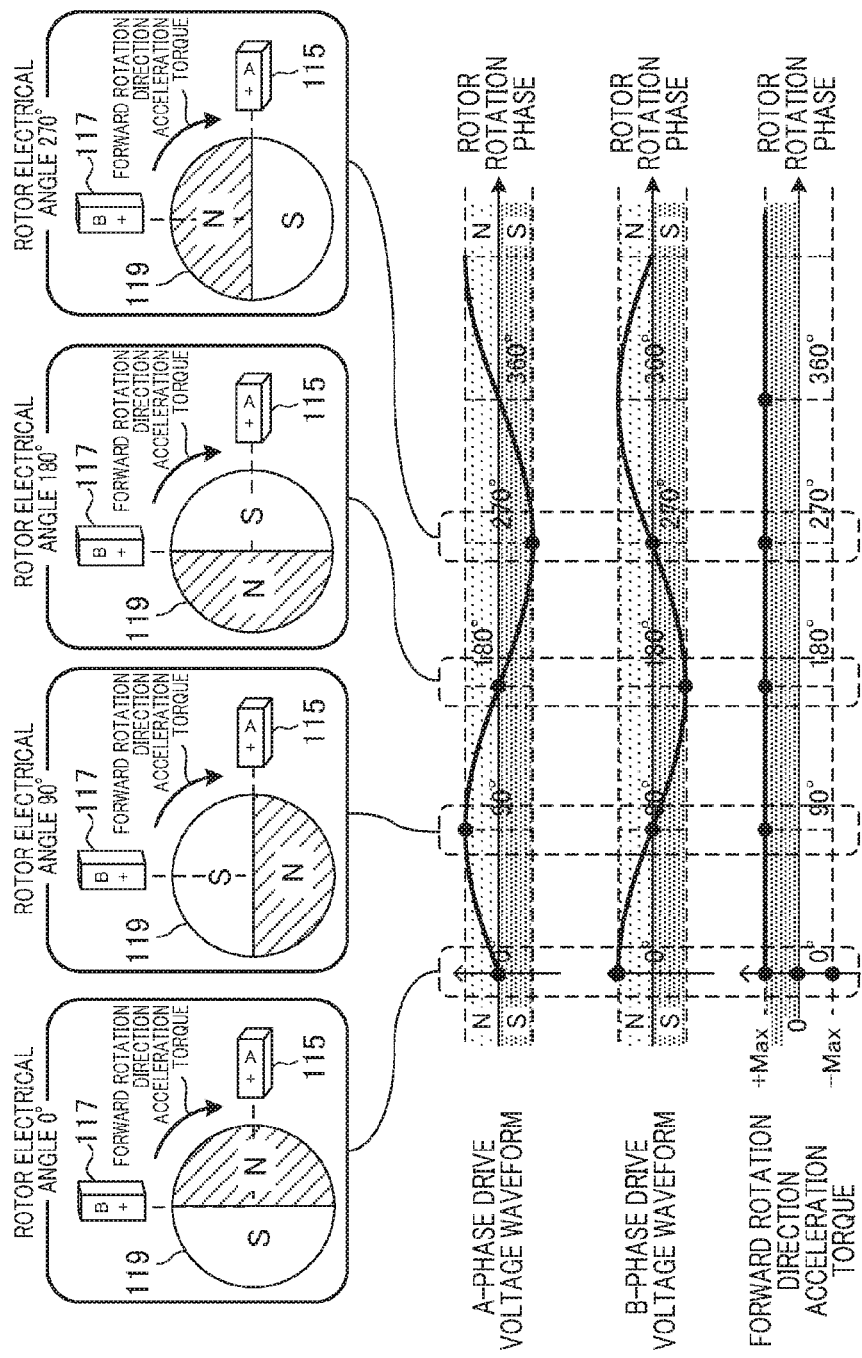

FIGS. 8A and 8B are diagrams that explain the size of the rotational torque due to the relation between the rotation phase of the rotor magnet 119 and the magnetization phase to the A-phase coil 113 and the B-phase coil 114. At the upper side of FIGS. 8A and 8B, four states (0 degrees, 90 degrees, 180 degrees, 270 degrees) are exemplified in which the rotational phase of the rotor magnet 119 are different at each electrical angle of 90 degrees in the range of the rotor electrical angles of 0 degrees to 270 degrees. The clockwise direction is defined as the forward rotation direction. The rotation position of the rotor magnet 119 represented by "rotor electrical angle of 0 degrees", that is, a boundary that changes from the north pole to the south pole at the magnetic pole position directly below the stator B+ 117, serves as a reference for the electrical angle (0 degrees). In FIGS. 8A and 8B, only the stator A+ 115 and the stator B+ 117 are shown to represent the stators. The waveform diagram at the lower side of FIG. 8A indicates the A-phase drive voltage waveform, the B-phase drive voltage waveform, and the forward rotation direction acceleration torque, from the top in order. The A-phase drive voltage waveform and the B-phase drive voltage waveform are the same as those in FIG. 5A. Thus, for example, in the state of the rotor electrical angle of 0 degrees, the A-phase drive voltage waveform is a maximum in the south pole side, and the stator A+ 115 has a maximum value of the south pole. The value of the B-phase drive voltage waveform is 0, and the stator B+ 117 is in a state in which the magnetization becomes 0. FIG. 8A illustrates a state in which the A-phase drive voltage waveform and the B-phase drive voltage waveform are each 0 degrees in the advance angle.

The relation between the rotor magnet 119 and the drive voltage waveform in FIG. 8A indicates a state in which the rotor stops without rotation or a state in which the speed by the drive command is extremely low, much less overload on the rotor, thereby the rotor is moving without follow-up delay to the drive command. In this case, the torque that increases the rotational speed of the rotor (acceleration torque) becomes 0.

FIG. 8B illustrates a state in which the A-phase drive voltage waveform and the B-phase drive voltage waveforms are advanced by a 90 degree electrical angle. In this context, "90 degree electrical angle" refers to an advance angle amount set in advance. This is a state in which the maximum torque is about to output because overload on the rotor is large, or a state that is realized in a case in which the drive waveform can be advanced in accordance with the phase state of the rotor. If the relation between the phase of rotor and the phase of the drive voltage waveform is a state shown in FIG. 8B, the acceleration torque becomes the maximum value (see +MAX in FIG. 8). Based on this, the process carried out in S804 and S806 of FIG. 7 will be described with reference to FIGS. 9A and 9B.

FIG. 9A illustrates a behavior upon the start of the rotation in the case of using the drive by the advance angle control. In the advance angle control, the number of optimal rotation is calculated so as to be a target advance angle state under a specific load on the motor, and control that sets the drive frequency in accordance with the number of rotation at that time each time a level change of the encoder signal is detected is performed. The term "advance angle state" refers to a state in which the advance angle is fixed, which is maintained by the advance angle control.

FIG. 9A illustrates each waveform of the ENC0 signal, the ENC1 signal, the A-phase drive voltage waveform, the B-phase drive voltage waveform, and the forward rotation direction acceleration torque, from the top. The horizontal axis shows time t, which is timing of a state transit to timing C, D, and E. The period of up to timing C indicates a period of time from the rotating state to the stopped state, a period of time from timing C to timing D indicates a period of time during the rotation stop state. During the period of time from timing C to timing D, the A-phase drive voltage waveform and the B-phase drive voltage waveform do not change. Depending on the rotation drive command at timing D, the A-phase drive voltage waveform and the B-phase drive voltage waveform starts to change. Accordingly, the rotation drive of the motor starts. During the period from the timing D to timing E, the speed by the drive command is extremely low, much less overload on the rotor, thereby the rotor is moving without follow-up delay to the drive command. When the ENC1 signal changes at timing E, the motor control device starts the advance angle control based on the rotational speed of the rotor. That is, the motor control device supplies a drive voltage waveform at which the advance angle is controlled to the motor. Thus, it is possible to start optimal acceleration movement to meet the rotor phase from timing E. Accordingly, the waveform of the acceleration torque in the forward rotation direction shown in FIG. 9A rises at timing E, and the optimum torque is generated. A force corresponding to an amount represented by an area F acts on the rotor.

FIG. 9B illustrates a behavior upon the start of rotation in the present embodiment. The arrangement of each waveform shown in FIG. 9B is same as those in FIG. 9A. In FIG. 9B, the timing of the state transition to the timing G, H, and I is illustrated. During a period of time up to timing G shows a period of time from the rotating state to the stopped state, and a period of time from timing G to timing H shows a period of time for the rotation stopped state. Rotation drive starts at timing H in response to the rotation drive command, and at this timing, the process of S804 and the process of S806 in FIG. 7 are executed. During a period of time from timing H to timing I, the motor control device supplies the A-phase drive voltage waveform and the B-phase drive voltage waveforms at which only an advance angle amount that has been set in advance is supplied to the motor. At time I, when the ENC1 signal changes, the motor control device starts the advance angle control based on the rotational speed of the rotor. In FIG. 9B, the maximum torque is generated at time H in accordance with the principle described with reference to FIG. 8B. Accordingly, a force corresponding to the amount represented by an area J during a period of time from timing H to timing I acts on the rotor, an acceleration performance improves in contrast to FIG. 9A. Here, a description will return to the flowchart of FIG. 7.

The process in S804 of FIG. 7 is a process that advances the phase of the drive waveform by adding 128 to the current table number. As shown in FIG. 4, the table number 128 corresponds to a 90 degree phase of the sine wave. That is, the process of S804 corresponds to the process in which the phase of the drive waveforms described in FIGS. 8A and 8B and FIGS. 9A and 9B are advanced 90 degrees in the travelling direction. After S806, in S808, the first PI signal change is detected after the start of drive, the process of advance angle control is started by the PI interruption processing of the CPU108. In the subsequent stage of S809, the moving processing to the target position by the advance angle control is executed.

If the rotation direction is determined to be the reverse rotation direction in S803, the process shifts to S805. In S805, the CPU 108 changes the value obtained by subtracting 128 from the table number output at the current stop position to the current table number. In the subsequent S806, the control that advances the table number in the − (minus) count direction from the start position with a frequency corresponding to the rotation start speed received by the rotation drive command. After that, the process shifts to S808. The process of S808 is different from S804 and S806 in that only the rotation direction is the reverse direction, and in the above description related to the process of S804 and S806, +128 is read as −128, the rotation direction is read as the reverse direction, and therefore the detailed descriptions thereof will be omitted. When the process of S809 is completed, in the subsequent step of S810, after rotation stop processing of the motor is executed by reaching the target position, the process will return to S802.

According to the present embodiment, the starting performance in the operation control of the stepping motor by the advance angle control is improved, and a time required for acceleration can be shortened. In particular, it is effective in the case of effectively performing the sine wave drive.

[Second Embodiment]

Next, a description will be given of a second embodiment of the invention. In the conventional control, speed information cannot be obtained unless the encoder signal is accepted twice or more, and the acceptance of the encoder signal less than twice may cause a difficulty in efficient acceleration by accurate advance angle control. Thus, in the present embodiment, for the purpose of efficient control, a process that calculates a speed by the first encoder signal is performed. A description will be given by focusing on differences with the first embodiment by using reference numerals that have already been used for the components that are the same as those in the first embodiment of the present embodiment, and omitting their detailed description.

With reference to FIGS. 10 to 13, a description will be given about how to perform effective rotation drive, specifically, the sine wave drive waveform in which a phase should be input to the A-phase coil 113 and the B-phase coil 114, during the rotation positioning of the rotor magnet 119. The rotor electrical angle has been described in FIGS. 8A and 8B.

Figure 10:
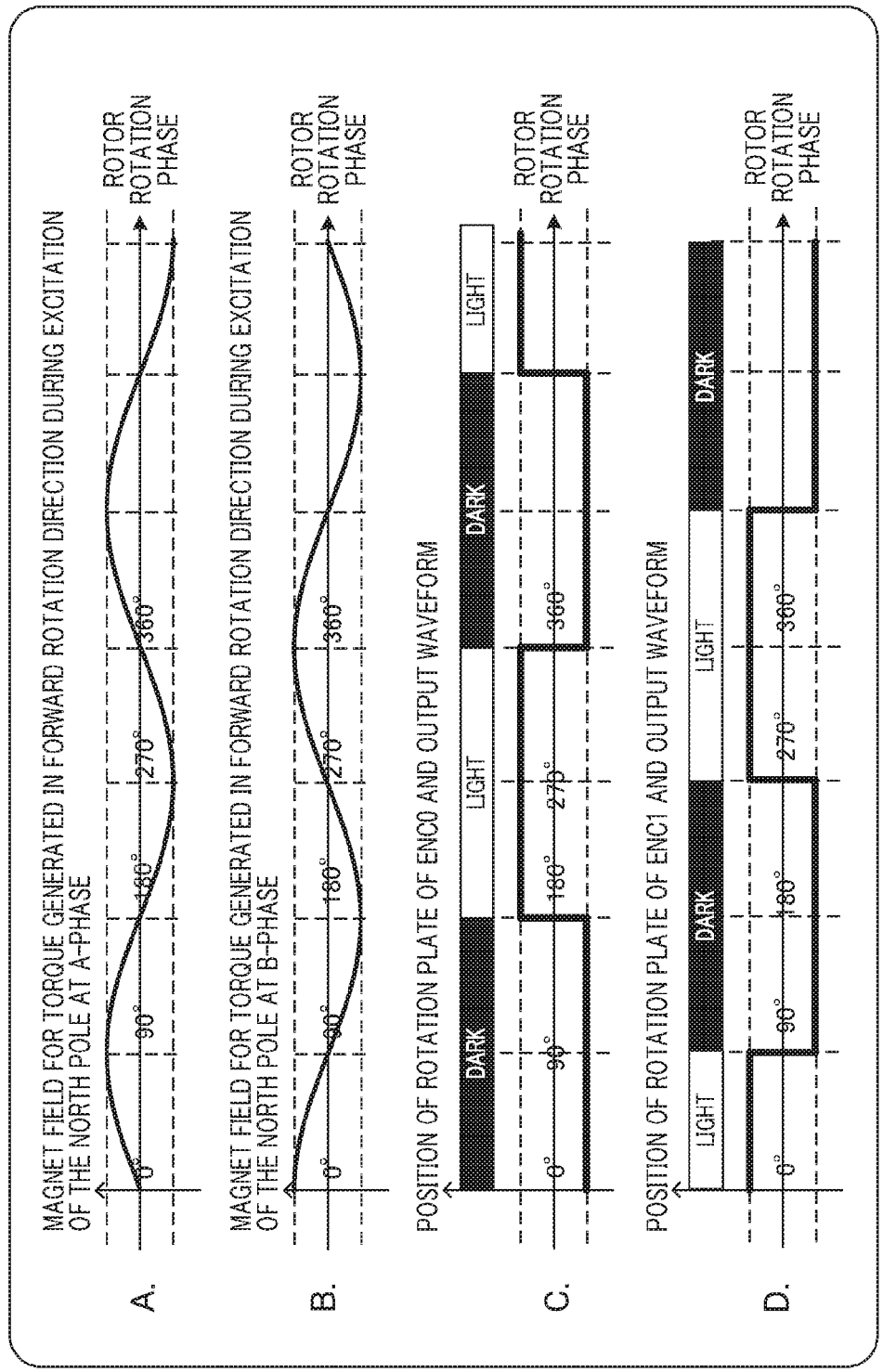
FIG. 10 is a diagram illustrating a state of the advance angle of 90 degrees in a second embodiment of the invention.
Figure 11:
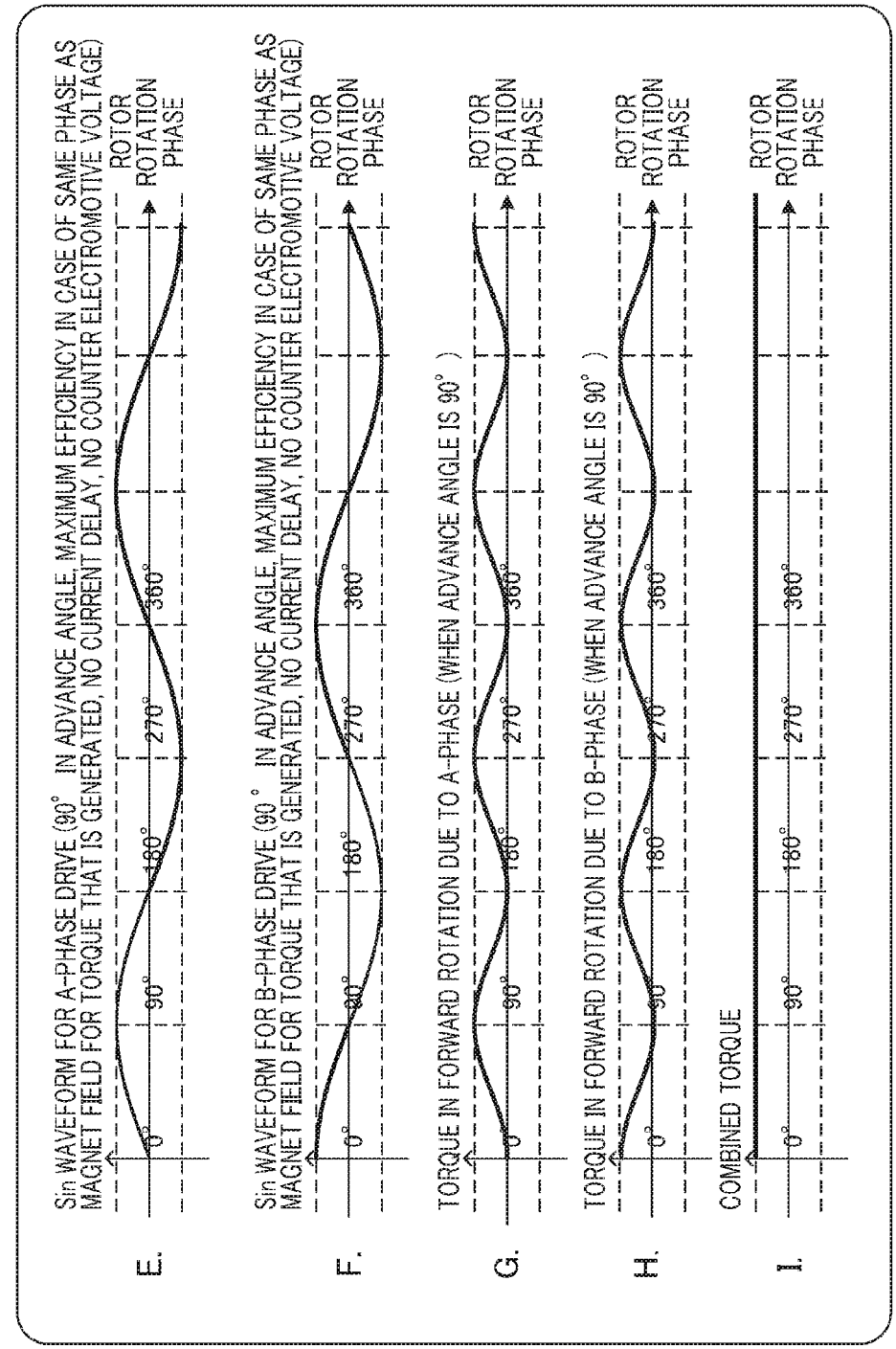
FIG. 11 is a diagram illustrating a state of the advance angle of 90 degrees in a second embodiment of the invention.
Figure 12:
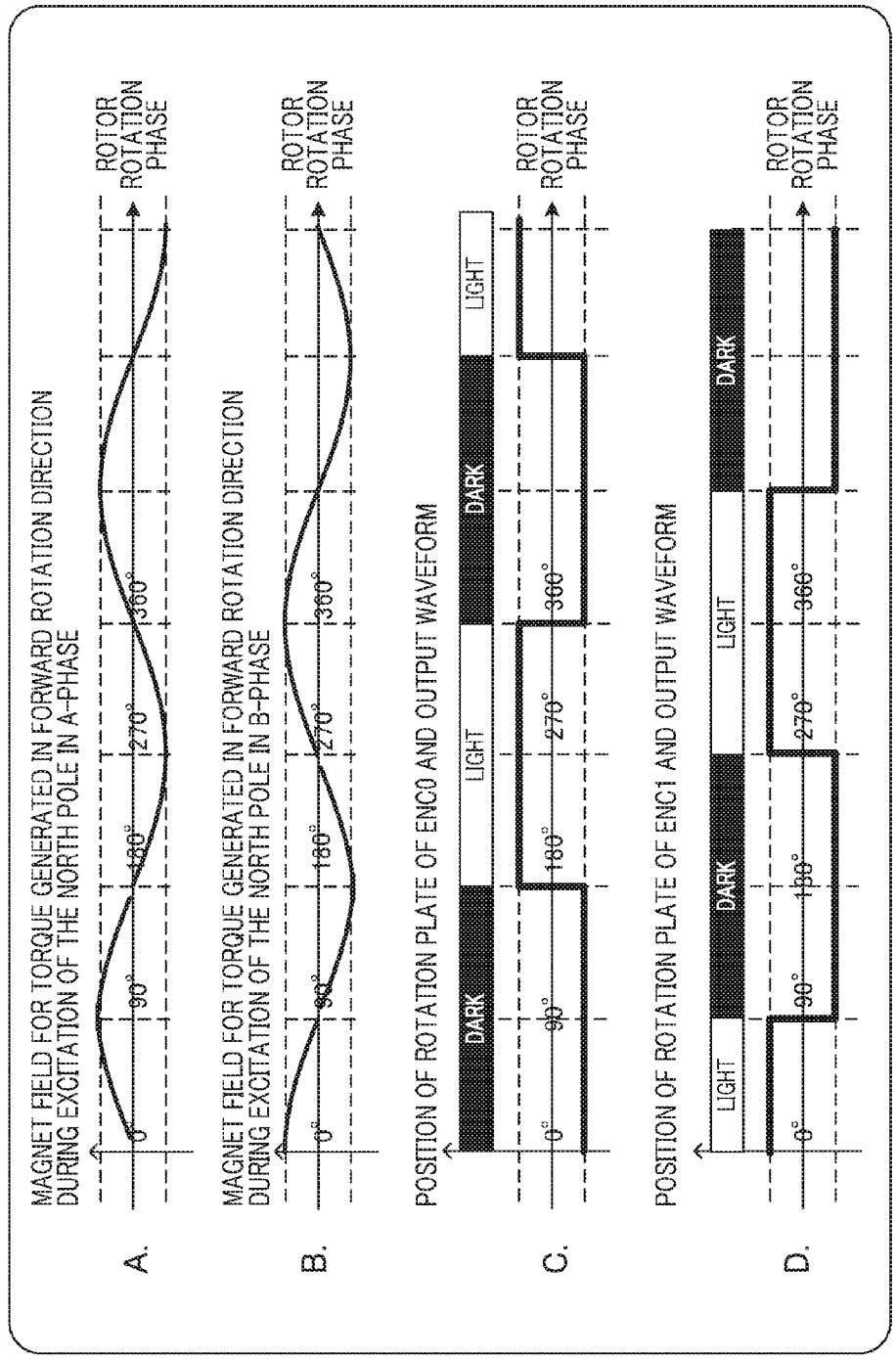
FIG. 12 is a diagram illustrating a state of the advance angle of 0 degrees in the second embodiment.
Figure 13:
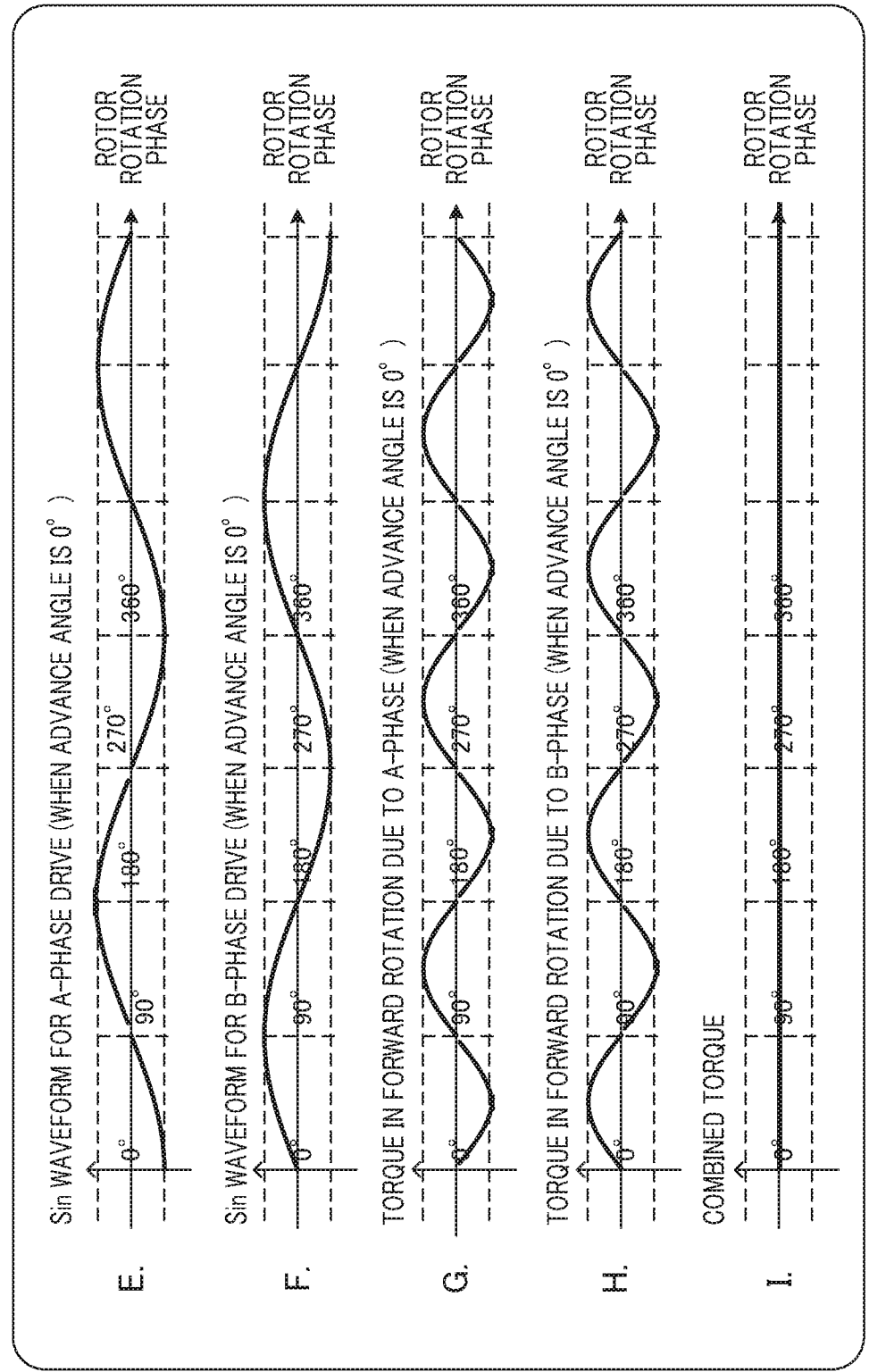
FIG. 13 is a diagram illustrating a state of the advance angle of 0 degrees in the second embodiment.

FIGS. 10 and 11 illustrate the drive waveform at the advance angle of 90 degrees and the rotation position of the rotor magnet 119. FIGS. 12 and 13 illustrate the drive waveform at the advance angle of 0 degrees and the rotation position of the rotor magnet 119. A graph A in FIG. 10 and a graph A in FIG. 12 show the rotor magnet field strength at the stator A+ 115 position if the stator A+ 115 is excited at the north pole. The value for providing the torque in the forward rotation direction with respect to the rotor magnet 119 is a positive value. If the rotor electrical angle is 0 degrees in FIGS. 10 and 11, the torque for which the rotor magnet 119 rotates is not generated no matter how the stator A+ 115 is excited. This is because a force generated by a magnetic force only acts in the direction perpendicular to the rotation direction of the rotor. Additionally, in the case of the rotor electrical angle of 90 degrees, when the stator A+ 115 is excited at the north pole, a repulsive force acts on the north pole of the rotor magnet 119 and an attractive force acts on the south pole of the rotor magnet 119 to thereby generate the maximum torque in the forward rotation direction. A graph B in FIG. 10 and a graph B FIG. 12 show the magnetic field related to the stator B+ 117, and the phase difference with the magnetic field shown in the graph A in FIG. 10 and the graph A in FIG. 12 is 90 degrees, and except for that, the graph B in FIG. 10 and the graph B in FIG. 12 are similar to the graph A in FIG. 10 and the graph A in 12, and therefore the detailed description will be omitted.

A graph C in FIG. 10 and a graph C in FIG. 12 show light and dark state by the slit rotation plate 105 at the position of the ch0-PI 103, and the ENC0 signal. The ENC0 signal is a signal obtained by binarizing the signal of ch0-PI 103, to be exact, there is a slight electrical delay from the switching of the light and dark state of slit rotation plate 105, but this is ignored in the present embodiment. The ENC0 signal is High level during the light state, and is Low level during the dark state. The output of the graph C in FIG. 10 and the graph C in FIG. 12 is in a state of FIG. 6A, and the electrical angle α is 0 degrees. A graph D in FIG. 10 and a graph D in FIG. 12 show the light and dark state in the ch1-PI 104, and the ENC1 signal. The graph D in FIG. 10 and the graph D in FIG. 12 are similar to the graph C in FIG. 10 and the graph C in FIG. 12, except for having a 90 degree phase difference, and therefore the detailed description regarding the graph D in FIG. 10 and the graph D in FIG. 12 will be omitted.

Hereinafter, with reference to the graphs A to I in FIGS. 10 and 11, a description will be given of a supply of the drive waveform that efficiently generates rotational torque to the rotor magnet 119. The torque is obtained by applying a current flowing in the A-phase coil 113 and the B-phase coil 114 with respect to magnetic field curves shown in FIGS. 10A and 10B. Because the waveform shown in FIGS. 10A and 10B is sine wave-shape, each current phase flowing to the A-phase coil 113 and the B-phase coil 114 has maximum torque when consistent with the phase of the magnetic field curves in FIGS. 10A and 10B. The current flowing through the coil causes a delay from the voltage waveform applied to the coil, and this delay changes due to the coil characteristics or the counter electromotive voltage generated in the coil. Accordingly, based on a case in which the phase of the voltage and current are identical, the sine wave voltage waveform of the maximum efficiency obtained by energization to the A-phase coil 113 and the B-phase coil 114 are shown in a graph E in FIG. 11 and a graph F in the 11, respectively. The graph A in FIG. 10 and the graph E in FIG. 11 are in the same phase relation, and the graph B in FIG. 10 and the graph F in FIG. 11 are in the same phase relation.

Graphs G and H in FIG. 11 each shows a torque curve caused by the A-phase coil 113 and a torque curve caused by the B-phase coil 114. The graph G in FIG. 11 shows a torque curve that represents the result for multiplying the graph A in FIG. 10 by the graph E in FIG. 11, and a graph H in FIG. 11 shows a torque curve that represents the result for multiplying the graph B in FIG. 10 by the graph F in FIG. 11. A combined torque obtained by adding two torque curves, in other words, a torque curve that is generated in the entire motor is shown in a graph I in FIG. 11, at which constant torque that always generates rotation, is generated.

FIGS. 12 and 13 illustrate the drive waveform at the advance angle of 0 degrees and the rotation position of and the rotor magnet 119. For example, in the rotor electrical angle of 0 degrees, as shown in a graph E in FIG. 13, the voltage waveform applied to the A-phase coil 113 is a negative maximum value, that is, the maximum south pole is generated in the stator A+. Additionally, in the rotor electrical angle of 0 degrees, as shown in a graph F in FIG. 13, the voltage value of the B-phase coil 114 is 0, in other words, the stator B+ is not being energized. At this time, the rotor magnet 119 is fixed and rotational torque is not generated. Thus, when the drive voltage is applied in the phase relation shown in FIGS. 11E and 11F, the torque in the forward rotation direction is not generated. If the motor is open-driven at an extremely low speed, the magnetization phase of the rotor magnet 119 and the phase of the drive waveform are rotated in a phase relation extremely close to FIG. 15. A graph G in FIG. 13 shows a torque curve due to the A-phase coil 113, and a graph H in FIG. 13 shows a torque curve due to the B-phase coil 114. Two torque curves are in the inverse phase relation, and have a torque integral value that is the same area in the positive and negative area. Therefore, the torque for the entire motor, shown in the combined torque curve of a graph I in FIG. 13, which is the sum of these, is always 0.

In the present embodiment, it is an object to always perform the rotation drive of the motor in the phase relation having the advance angle of 90 degrees shown in FIGS. 10 and 11. Hereinafter, with reference to FIGS. 12 to 14, a description will be subsequently given of which phase value in the drive waveform should be obtained at each timing of the ENC0 signal and the ENC1 signal during the rotation drive in order to have the state of the advance angle of 90 degrees. "Each timing of the ENC0 signal and the ENC1 signal" refers to the timing of the fall and rise of the ENC0 signal, and timing of the fall and rise of the ENC1 signal. The rise of the ENC0 signal refers to as "Enc0Up", and the fall of the ENC0 signal refers to as "Enc0Down". The rise of the ENC1 signal is referred to as "Enc1Up", and the fall of the ENC1 signal is referred to as "Enc1Down".

Figure 14:
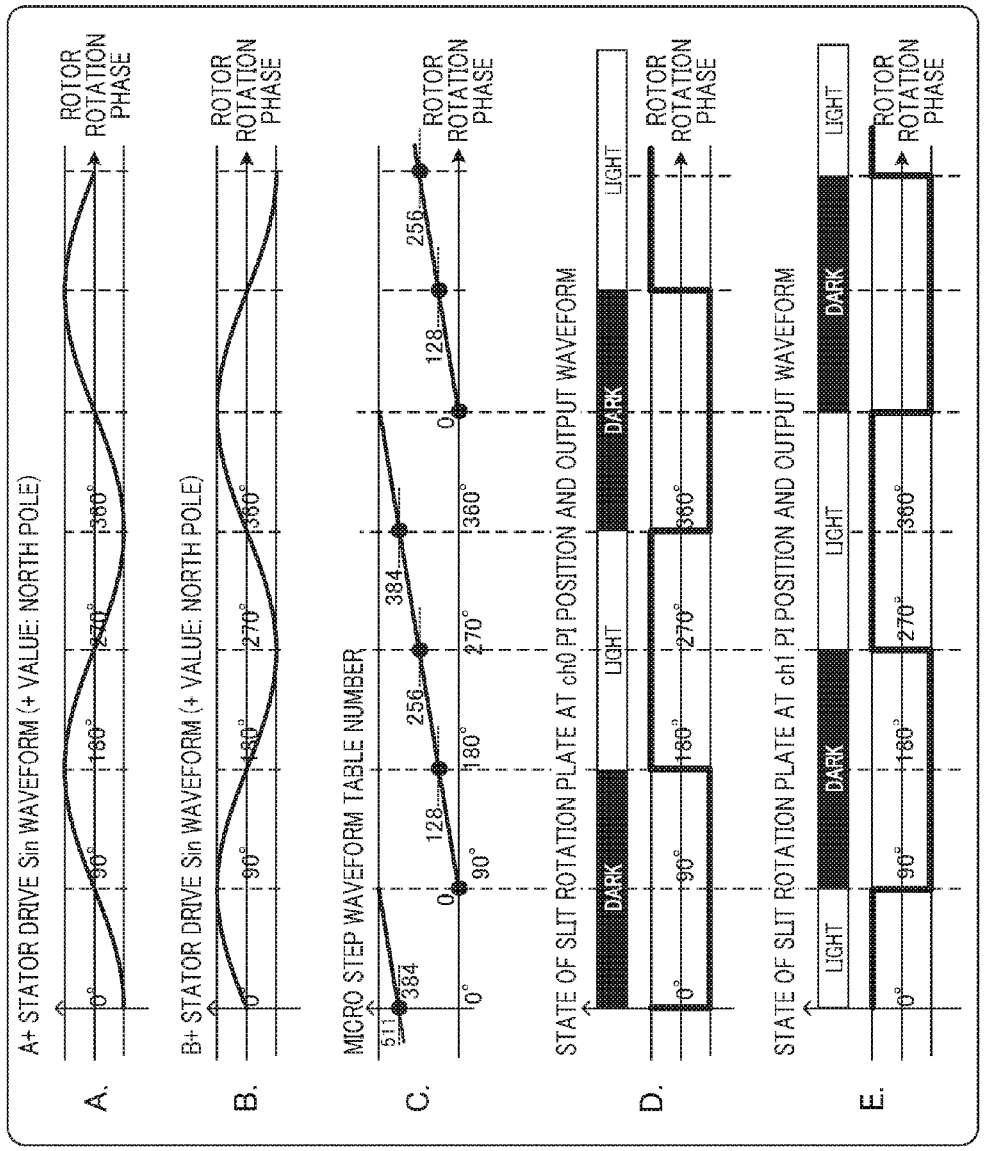
FIG. 14 is a diagram illustrating a state of the advance angle of 0 degrees during forward rotation in the second embodiment.

First, FIG. 14 shows the drive waveform in the state of an advance angle of 0 degrees and the relation between the ENC0 signal and the ENC1 signal. A graph A in FIG. 14 shows a voltage waveform applied to the A-phase coil 113. A graph B in FIG. 14 shows a voltage waveform applied to the B-phase coil 114. A graph C in FIG. 14 shows a table number value corresponding to the drive waveform of FIGS. 14A and 14B by visualizing it with a linear graph. A graph D in FIG. 14 shows a state of the ENC0 signal. A graph E in FIG. 14 shows a state of the ENC1 signal. As shown in FIG. 14, in a case where control that maintains the state of the advance angle of 0 degrees is performed during the drive, it is sufficient if the table number 128 of a drive waveform can be obtained at the timing of Enc0Up. Other than that, it is sufficient if the table number 384 at the timing of Enc0Down, the table number 256 at the timing of Enc1Up, the table number 0 at the timing of Enc1Down can each be obtained.

Figure 15:
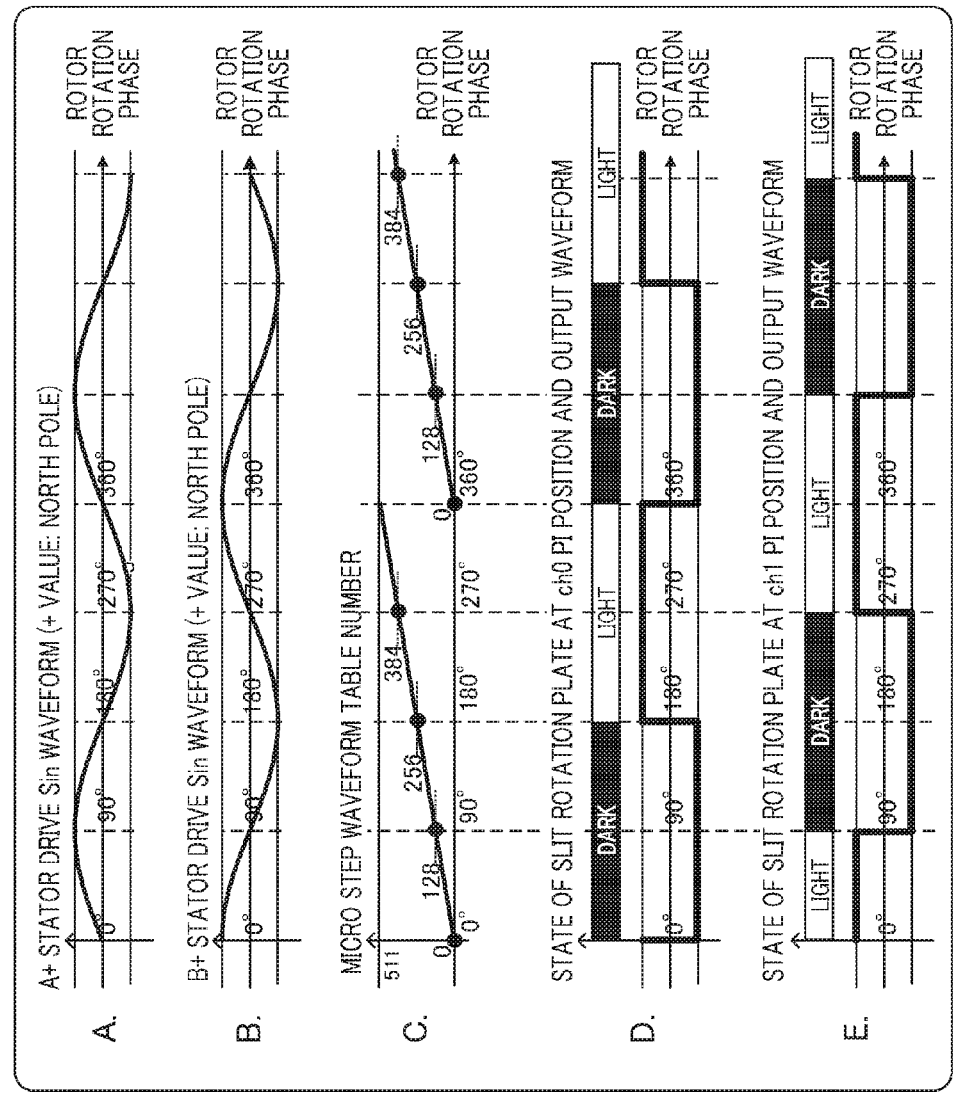
FIG. 15 is a diagram illustrating a state of the advance angle of 90 degrees during forward rotation in the second embodiment.

FIG. 15 shows a case of a state of the advance angle of 90 degrees, and as compared with the case of FIG. 14, the drive waveform advances at 90 degrees. To maintain the rotation drive in the state of the advance angle of 90 degrees, it is sufficient if the table number 256 at the timing of Enc0Up, the table number 0 at the timing of Enc0Down, the table number 384 at the timing of Enc1Up, and the table number 128 at the timing of Enc1Down can each be obtained. As described above, the phase of the drive waveform in the case of maintaining a specific advance angle state and the phase relation between the ENC0 signal and the ENC1 signal have been described, and this assumes that output change of the ENC0 signal and the ENC1 signal when the rotation position is rotated at θ degrees is in the state shown in FIG. 6A.

Figure 16:
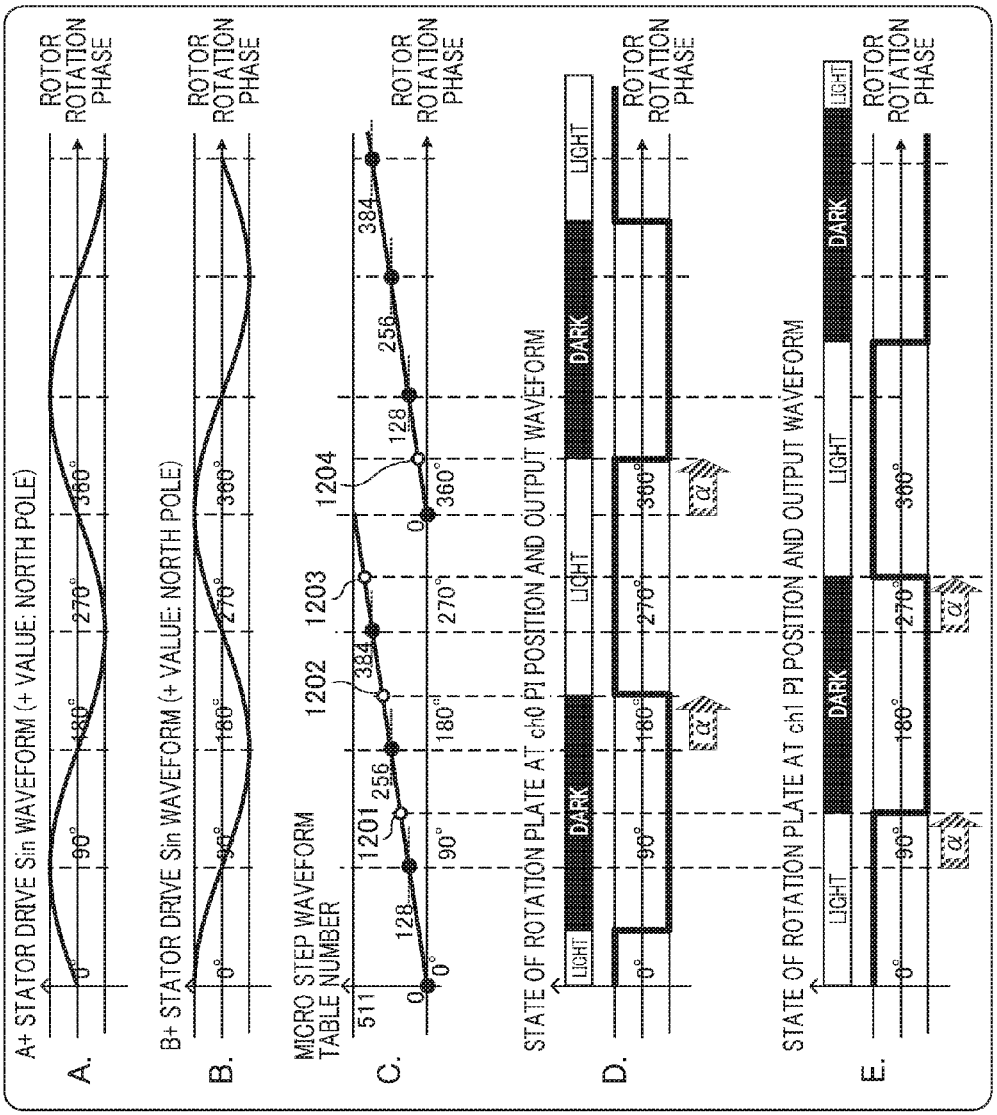
FIG. 16 is a diagram illustrating phase shift in the state of the advance of 90 degrees during forward rotation.

Next, as in the state of FIG. 6B, a description will be given of a case in which the north pole phase of the rotor magnet 119 and the phase of the slit rotation plate 105 in the light state are not coincident. FIG. 16 shows the relation in a case where the phase of the slit rotation plate 105 is attached to the position shifting at the electrical angles. If there is a shift of attachment position shown by the electrical angle α in the slit rotation plate 105, a shift at the electrical angle α occurs in the ENC0 signal and the ENC1 signal, with respect to the rotation of the rotor magnet 119. At this time, in order to maintain the state of the advance angle of 90 degrees during the drive, it is necessary to be able to obtain the table number value (see the white point 1202), which is "256+α" at the timing of the Enc0Up. Other than that, it is necessary to be able to obtain each of the table numbers "0+α" at the timing of Enc0Down, "384+α" at the timing of Enc1Up, "128+α" at the timing of Enc1Down. In FIG. 16, the position corresponding to each table number is each shown with the white points 1204, 1203, and 1201.

Figure 17:
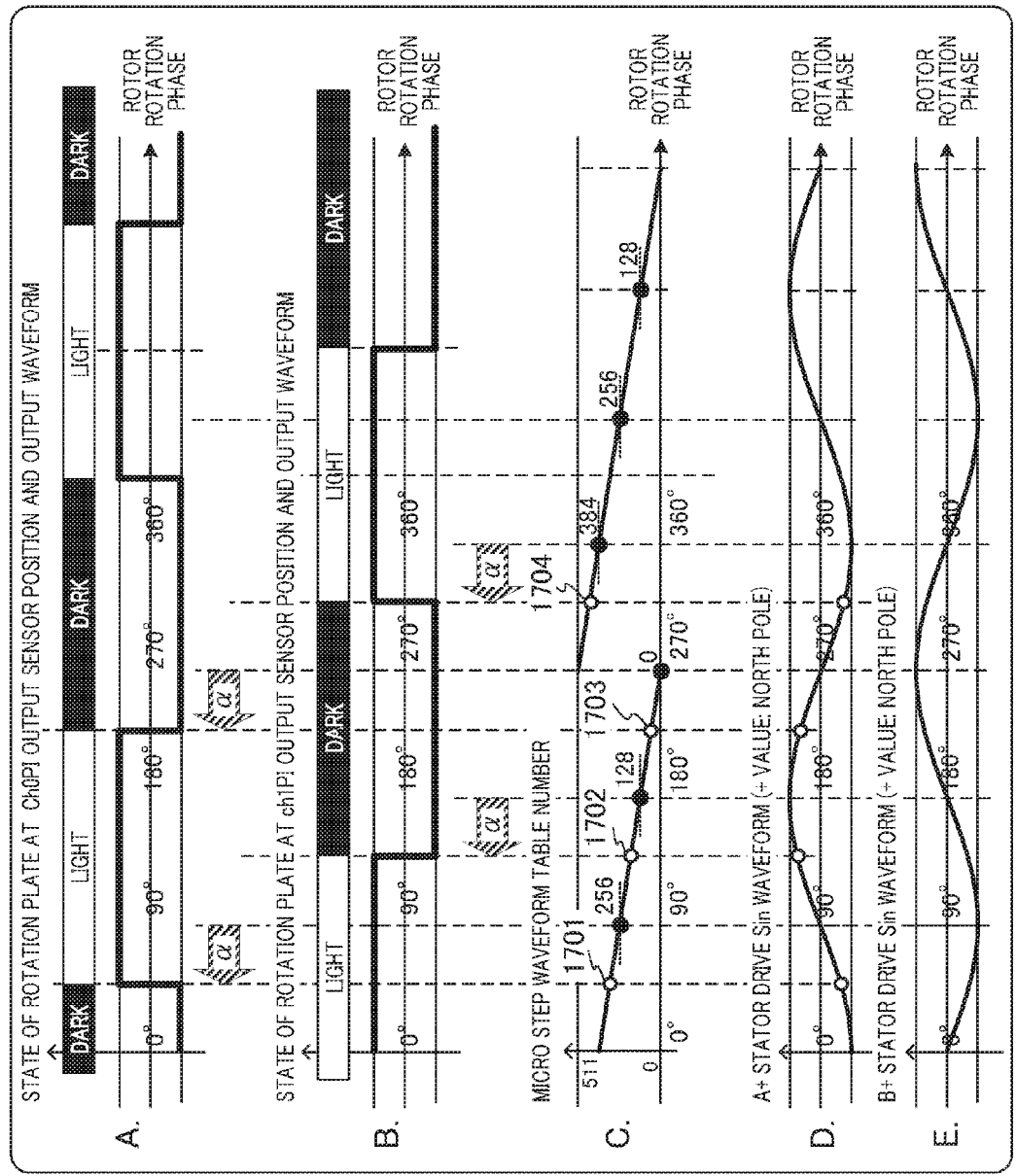
FIG. 17 is a diagram illustrating a state during reverse rotation in the second embodiment.

The above description corresponds to the case of the rotation in the forward rotation direction, which is the clockwise rotation. In the case of the rotation in the reverse rotation direction, which is the counterclockwise rotation, the orientation of the phase angle is the opposite. That is, as shown in FIG. 17, the ENC0 signal and the ENC1 signal advance by the electrical angle α (delayed by the electrical angle α in the case of the rotation in the forward rotation direction) A graph A in FIG. 17 illustrates the relation between the rotation phase of the rotor magnet 119, light/dark state of the slit rotation plate 105, and the output of the ENC0 signal. A graph B in FIG. 17 illustrates the relation between the rotation phase of the rotor magnet 119, light/dark state of the slit rotation plate 105, and the output of the ENC1 signal. A graph C in FIG. 17 illustrates a transition of the table numbers of the drive waveform. A graph D in FIG. 17 illustrates a voltage waveform to the A-phase coil 113, and a graph E in FIG. 17 illustrates a voltage waveform to the B-phase coil 114. Basically, they are similar to those described for FIG. 12A to FIG. 14. Thus, their detailed description will be omitted.

Figure 18:
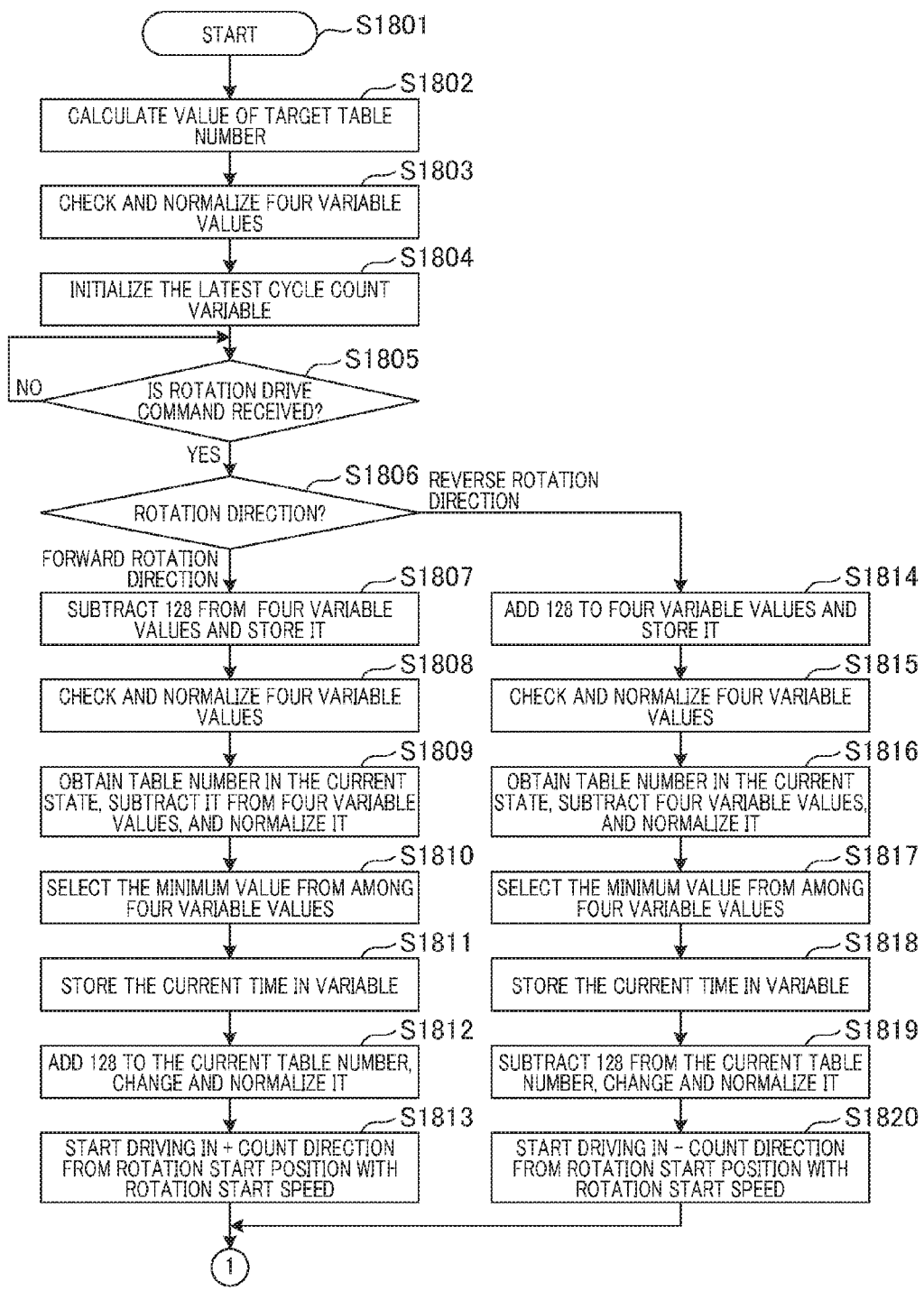
FIG. 18 is a flowchart illustrating processing in the second embodiment.

Next, with reference to from FIG. 18 to FIG. 20B, a description will be given of motor control in the present embodiment. FIG. 18 is a flowchart illustrating a process example of the present embodiment. The following process is executed in accordance with a program under the control of the CPU 108. The process starts from S1801, and in the subsequent S1802, the CPU 108 calculates a target table number value for each timing factor of the ENC0 signal and the ENC1 signal, based on the value of the electrical angle α that has been specified in advance. In this process, based on the matters described in FIG. 16, the value obtained by adding α (α=0) to the default table value for each factor, which are the ENC0 signal and the ENC1 signal, is substituted for each of four variables. Each variable is as follows:

Variable that stores a target table number value to be obtained upon the rise of the ENC0 signal TrgtSameTimeTableNumForEnc0Up=256+α

Variable that stores a target table number value to be obtained upon the fall of the ENC0 signal TrgtSameTimeTableNumForEnc0Down=0+α

Variable that stores a target table number value to be obtained upon the rise of the ENC1 signal TrgtSameTimeTableNumForEnc1Up=384+α

Variable that stores a target table number value to be obtained upon the fall of the ENC1 signal TrgtSameTimeTableNumForEnc1Down=128+α

In the subsequent S1803, four variable values set in S1802 are checked with respect to whether or not they are within the range of 0 to 511. If the value exceeds 511, 512 is subtracted from the value to be reset and the process that normalizes the value within 0 to 511 is executed.

In S1804, a variable that stores the latest cycle count value (CurQrtPrdCnt) is initialized to 0. This variable has a value corresponding to the time between the two latest switchings of the ENC0 signal and the ENC1 signal to be used for the process below. S1805 is a determination process that determines the presence or absence of the reception of the rotation drive command. In S1805, the reception of the rotation drive command is waited, and when the rotation drive command is received, the process proceeds to S1806. In S1806, the CPU 108 compares the current rotation position and the target position by the rotation command, and determines the rotation direction of the motor. If the rotation direction is the forward rotation direction, the process shifts to S1807, and if it is the reverse rotation direction, the process shifts to S1814. A case in which the process shifts to S1807 will be described below.

S1807 to S1810 are processes that calculate the rotational phase amount to the rotational phase at which the PI signal first changes if the motor rotates in the rotation direction specified by the rotation drive command from the rotation phase in the current stop state. The principle will be explained with reference to FIG. 21.

Figure 21:
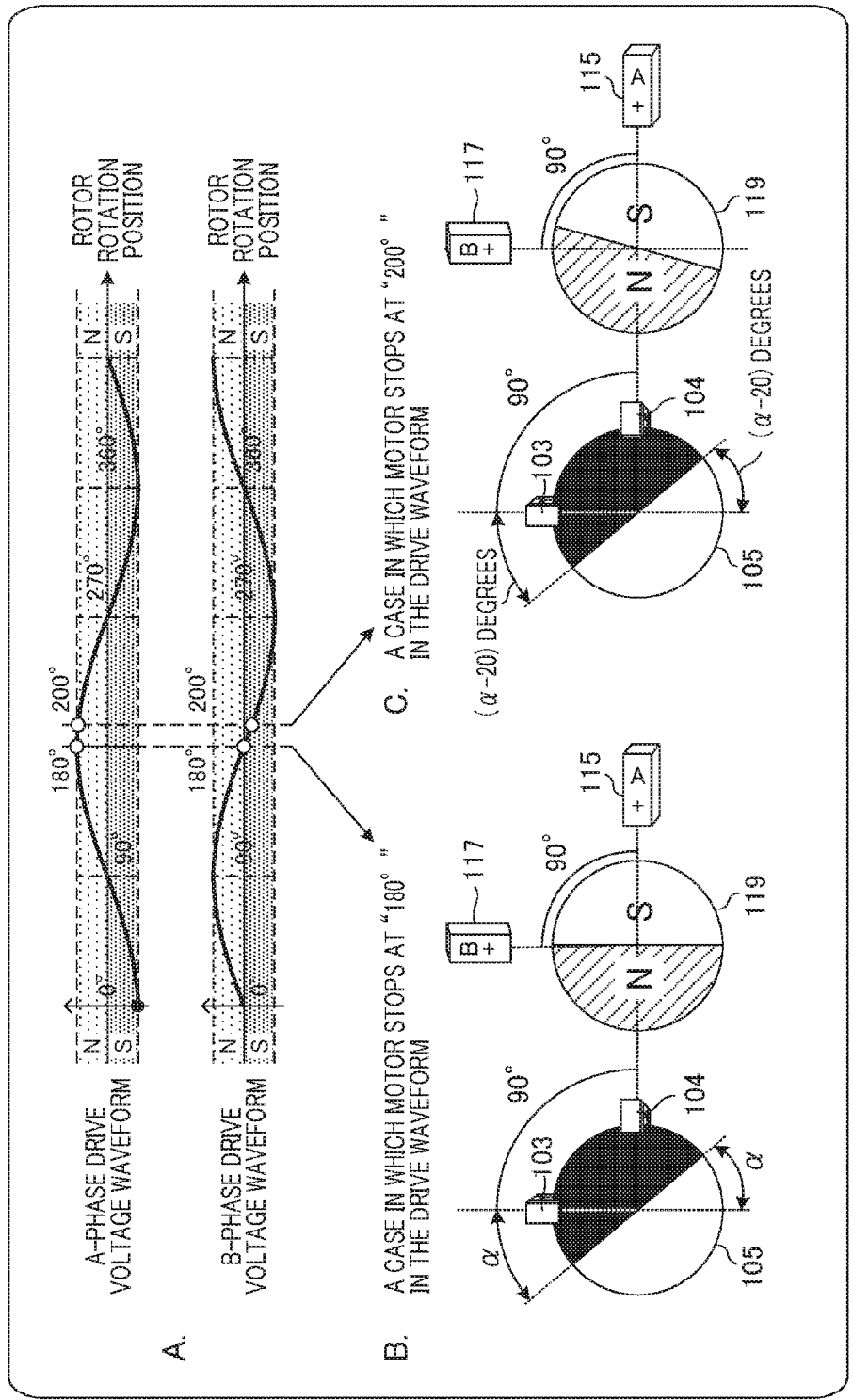
FIG. 21 is a diagram illustrating calculation processing of the initial rotation amount in the second embodiment.

A graph A in FIG. 21 shows each energization phase to the A-phase coil 113 and the B-phase coil 114. A graph B in FIG. 21 shows a state in which the motor stops on the energization phase of 180 degrees in the graph A in FIG. 21. A graph C in FIG. 21 shows a state in which the motor stops on the energization phase of 200 degrees in a graph A in FIG. 23. In the state shown in the graph B in FIG. 21, the A-phase coil 113 is energized to the north pole, and the energization amount to the B-phase coil 114 is 0. Thus, as shown in the graph B in FIG. 21, the rotor magnet 119 stops on the rotational phase on which the north pole is to the left and the south pole is to the right. At this time, the value of $\alpha$ that indicates a phase shift between the magnetization phase of the rotor magnet 119 and the light/dark phase of the slit rotation plate 105 has already been obtained. From this fact, it is found in advance that the ch0-PI 103 changes from a dark state to a light state when the rotation by the amount corresponding to the value of the electrical angle $\alpha$ is performed. If the motor stops on the energization phase of 200 degrees, as shown in the graph C in FIG. 21, it is found in advance that the ch0-PI 103 changes from a dark state to a light state when the rotation by the phase amount ($\alpha$−20) is performed. The process from S1807 to S1810 will specifically be explained below.

In S1807, 128 is subtracted from each of four variable values that have been determined in S1803, and each subtraction result is stored in four variables, TmpPrgDegCnt [n](n=0-3), which are temporary variables. Specifically, the value of the variable, TrgtSameTimeTableNumForEnc0Up, is substituted for TmpPrgDegCnt [0], and the value of the variable, TrgtSameTimeTableNumForEnc1Up, is substituted for TmpPrgDegCnt [1]. The value of the variable, TrgtSameTimeTableNumForEnc0Down, is substituted for TmpPrgDegCnt [2], the value of the variable, TrgtSameTimeTableNumForEnc1Down, is substituted for TmpPrgDegCnt [3]. In the subsequent S1808, the CPU 108 determines the value of the four variables in S1807, and adds 512 to a negative value to be normalized to a value between 0 and 512. In S1809, the value of the table number of the sine wave, CurTblNum, in the current stopped state is obtained, and the value of the table number, CurTblNum, is subtracted from the four variable values that have been determined in S1808. At that time, if the value after subtraction becomes a negative value, 512 is added to be normalized to a value between 0 and 512.

In S1810, the CPU 108 compares the four values determined at S1809 with each other, and selects the minimum value among them. This value is the rotation phase amount in a period of time from the current stop phase to the (first) change of the encoder signal after the rotation start. The selected value is substituted for the variable, InitMoveLenCnt, and is held in the memory. That is, the value of the variable, InitMoveLenCnt indicates an initial moving amount from the start timing of driving after the stop of the motor to the timing when the position detection signal changes for the first time. In S1810, it is possible to determine which cause brings the next change of the encoder signal based on the value of the array index n of the selected variable, TmpPrgDegCnt [n]. For example, when TmpPrgDegCnt [1] is selected from among four variables, TmpPrgDegCnt [0] to TmpPrgDegCnt [3], the rise of the ENC1 signal occurs. In S1811, the current time is stored in the variable, StartTIme, as a rotation start time. Time measurement with sufficient accuracy is performed by using a timer provided in the CPU that has been generally used, or the like, and the current time is obtained based on the measurement value by the timer.

In S1812, the CPU 108 adds 128 to the table number corresponding to the output at the position at which the motor is currently stopped, and the value of the result for addition is changed to the current table number. If the value of the result for addition is 512 or more, 512 is subtracted from the table number, and the result value is set. Subsequently, in S1813, the process that advances the table number in the + count direction starts with the frequency corresponding to the rotation start speed that has been obtained upon the receipt of the rotation drive command. The rotation start speed is set to a speed within a range in which the motor is open-drived and can normally be rotated. The time interval between the process of S1812 and S1813 is as short as possible, preferably substantially simultaneous. The reason for advancing the phase by adding 128 to the table number in S1812 is as described with reference to FIGS. 8A and 8B and FIGS. 9A and 9B.

In S1806, if the rotation direction is determined to be the reverse rotation direction, the process from S1814 to S1820 is performed. In this case, the process from S1814 to S1820 is substantially the same as those from S1807 to S1813 except that the count direction of the table number is the opposite, and the relation of the addition and subtraction in the case of advancing the table number value is thus the opposite, and therefore the detailed description will be omitted.

Figure 19:
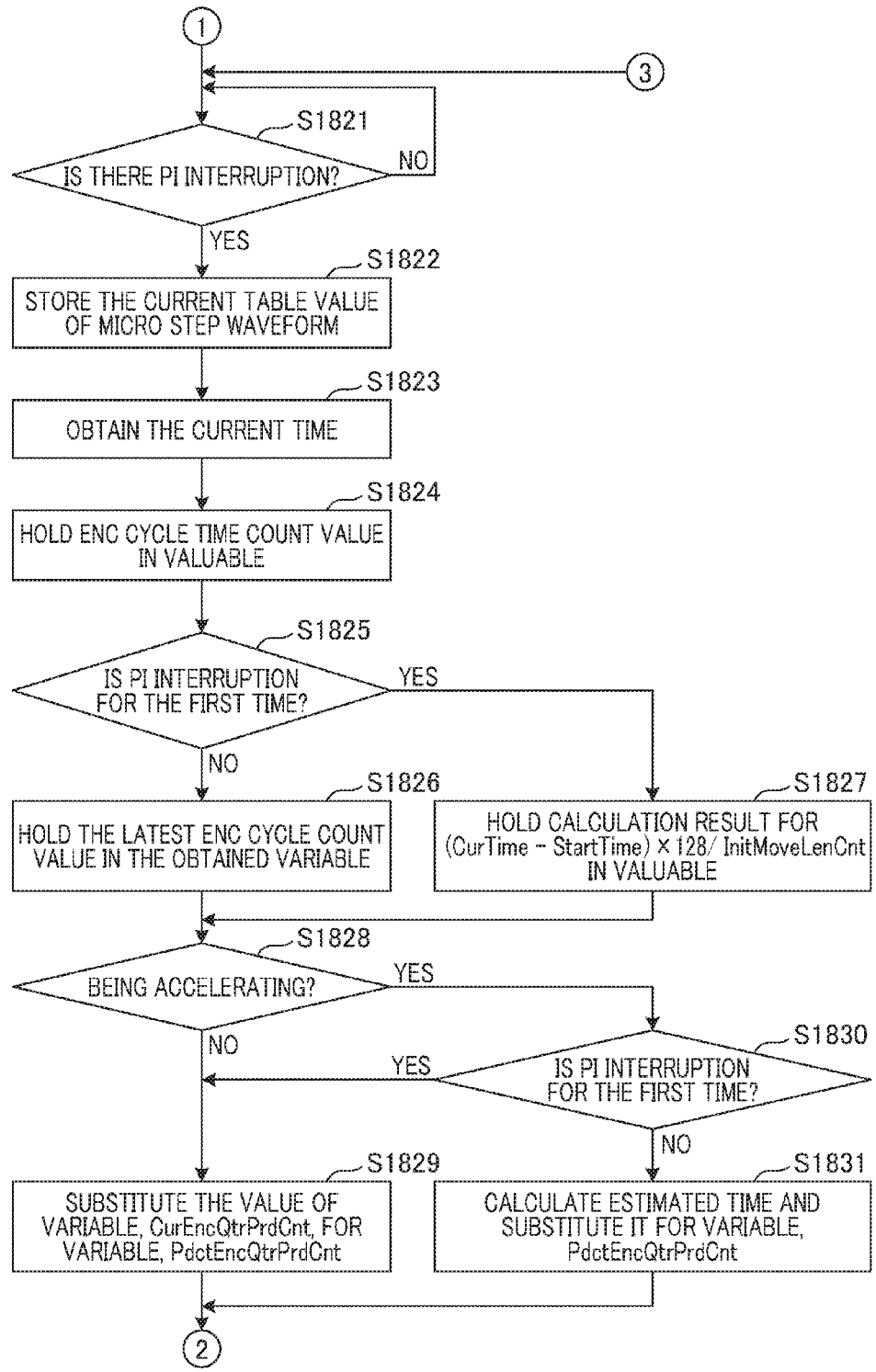
FIG. 19 is a flowchart illustrating processing subsequent to FIG. 18.

In S1821 of FIG. 19, the CPU 108 determines whether or not there is an interruption by the PI signal. The PI signal is a signal that generically refers to a signal at each timing of Enc0Up, Enc0Down, Enc1Up, and Enc1Down. The cause of change of these four signals generates interruption processing of the CPU 108 through the encoder circuit 107. If there is no interruption by the PI signal, the CPU 108 continues in processing standby until the interruption by the PI signal occurs. If the interruption by the PI signal occurs, the process proceeds to S1822, and the CPU 108 obtains the table number of the micro-step waveform that indicates the current phase of the drive energization waveform, and substitutes it for the variable, CurTblNum. In the subsequent S1823, the current time is obtained, and is substituted for the variable, CurTime. The length of time taken for obtaining and holding the current time in S1823 after the timing of the occurrence of the interruption in S1821 is only a time difference enough to be regarded as almost the same amount of time, for the process to be described below. In S1824, the ENC cycle time count value as of the current moment is substituted for the variable, PastCurEncQrtPrdCnt, and held. The ENC cycle time count value is a measurement value of the cycle time of the ENC signal.

S1825 to S1827 are processes for obtaining a count value of the change cycle time of the PI signal used in the subsequent process, or a count value of the estimated time corresponding to it. The outline of the present processing will be described with reference to FIG. 22.

Figure 22:
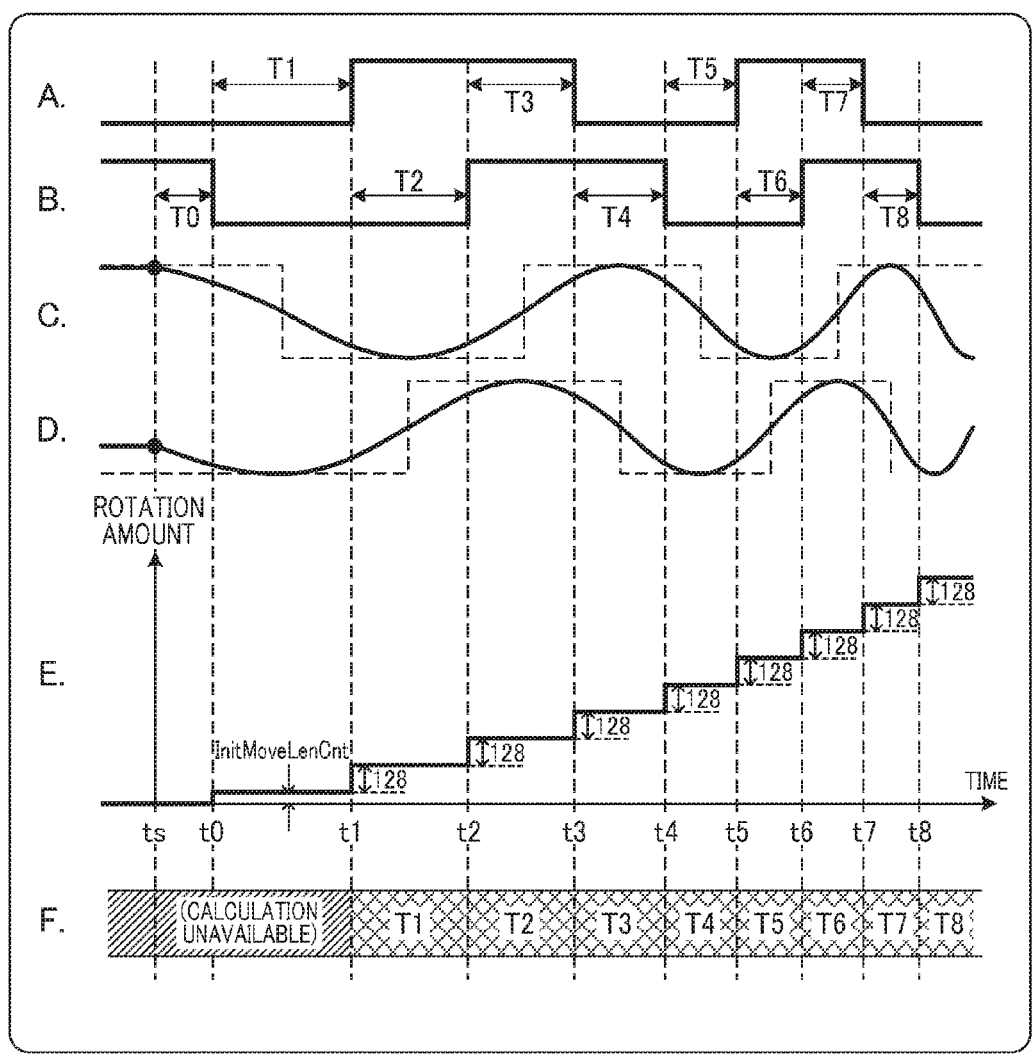
FIG. 22 is a diagram illustrating speed calculation processing in the second embodiment.

A graph A in FIG. 22 illustrates the output of the ENC0 signal, serving the horizontal axis as a time axis. A graph B in FIG. 22 illustrates the output of the ENC1 signal, serving the horizontal axis as a time axis. A graph C in FIG. 22 illustrates the A-phase drive voltage waveform, serving the horizontal axis as a time axis. A graph D in FIG. 22 illustrates the B-phase drive voltage waveform, serving the horizontal axis as a time axis. In a graph E in FIG. 22, the vertical axis represents a rotation amount of the rotor, and the horizontal axis represents time. In a graph F in FIG. 22, cycle time that has been taken for moving by the rotation amount of 128 counts in the cycle time between the ENC signals, which can equivalently be treated as a speed, is illustrated in each time segment. The ENC0 signal and the ENC1 signal are both adjusted so as to have a 50% duty ratio and a 90 degree phase difference. That is, the rotation amount of the rotor that moves between the signal change of the ENC0 signal and the ENC1 signal is uniformly a 90 degree electrical angle, and it can be treated as a speed by taking a reciprocal of the ENC cycle time. On the time axis, timing ts and t0, t1 to t8 are shown. From timing t1 to t2, the time difference T1 from timing t0 to timing t1 can be used as a value that is equivalent to a speed. Thereafter, time information that is equivalent to a speed is obtained each time the PI signal changes, followed by t2, t3, and the like.

At timing t0, because the change of the ENC signal does not occur immediately before timing t0, it is not possible to calculate the speed information by the time difference in the change between the ENC0 signal and the ENC1 signal. Accordingly, the value stored in the variable, InitMoveLenCnt obtained in S1810 and S1817 in the flowchart of FIG. 18, is used to calculate T0 as the speed information at timing t0. The motor has been moved by the rotation amount of the value of the variable, InitMoveLenCnt, during the difference time (moving time) between rotation start time ts in FIG. 22 and initial change timing t0 of the ENC signal, and thus, the speed information can be calculated based on these. Specifically, the formula, "(t0−ts)×128/InitMoveLenCnt" is used. From this formula, the cycle time that can be treated equivalently to the speed when the rotor magnet 119 at timing t0 moves a 90 degree the electrical angle can be calculated. These processes are performed in S1825 to S1827 in the flowchart of FIG. 19. In S1825, the determination whether or not the interruption by the PI signal is the first time or not is performed. If the interruption by the PI signal is the first time, the process proceeds to S1827, and the value calculated by the formula described above is substituted for the variable, CurEncQrtPrdCnt. That is the calculation of "(CurTime−StartTime)×128/InitMoveLenCnt" is performed, and a value indicating the result for the calculation is held in the variable, CurEncQrtPrdCnt. CurTime corresponds to t0 described above, and StartTime corresponds to ts described above. Additionally, if the interruption by the PI signal is the second time or the subsequent times, the process proceeds to S1826, the latest ENC cycle time count value is obtained, and the value is substituted for the variable, CurEncQrtPrdCnt.

Figure 23:
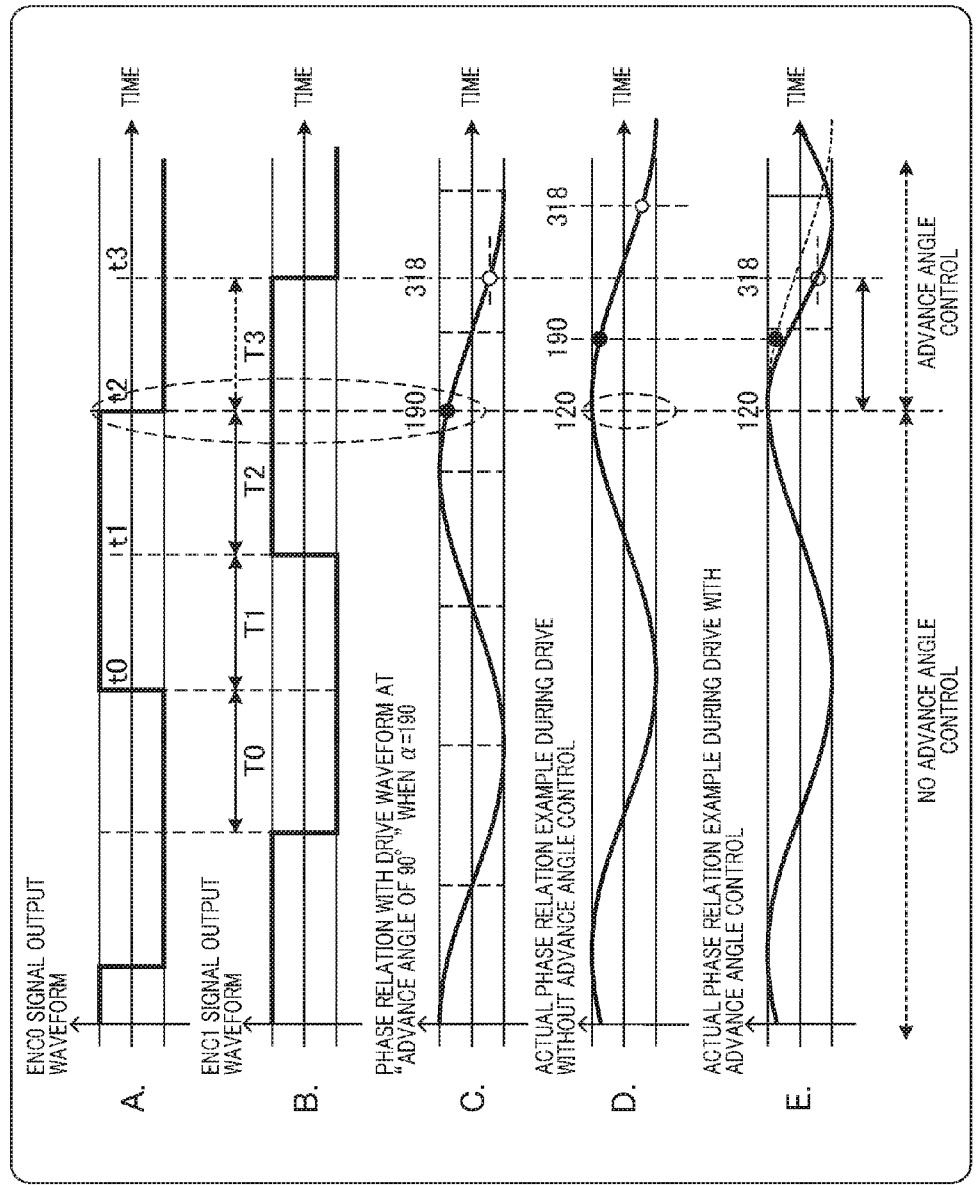
FIG. 23 is a schematic diagram of advance angle control in the second embodiment.

In the subsequent steps of S1828 to S1844, the process for maintaining a desired advance angle state during the drive of the motor is performed. The outline of this process will be described with reference to FIG. 23. FIG. 23 illustrates a case of the forward rotation at 190 corresponding to the electrical angle α (a case in which one cycle of the sine wave is divided into 512) as a shift amount of the attachment position of the rotor magnet 119 and the slit rotation plate 105. The graph A in FIG. 23 illustrates the output of the ENC0 signal, serving the horizontal axis as a time axis. A graph B in FIG. 23 illustrates the output of the signal ENC1, serving the horizontal axis as a time axis. Graphs C to E in FIG. 23 illustrate an energization waveform sent to the A-phase coil 113.

The graph C in FIG. 23 illustrates an energization waveform to the A-phase coil 113 with respect to the ENC0 signal phase in a state in which a position corresponding to the electrical angle α is 190 with the advance angle of 90 degrees. As described in FIGS. 14A to 14E, the drive waveform table number with the advance angle of 90 degrees, obtained at the timing of Enc0Down, is 0+α. Thus, 0+190=190 is the drive waveform table number to be obtained at the timing of Enc0Down. However, a case is assumed in which the phase relation when the drive waveform having a specified frequency is actually applied to the coil and rotated is in the state of the graph D in FIG. 23. In the graph D in FIG. 23, at the timing of Enc0Down, table number 120 is obtained. At this time, the drive waveform is delayed with respect to the rotor in the phase that corresponds to the table number of 190−120=70, as compared with the state of the advance angle of 90 degrees. When converted to the advance value, the drive waveform is delayed by 70×360/512=49.2 degrees, and the motor rotates with the advance angle of 40.8 degrees as the advanced angle state. The advanced angle state is determined by a load on the motor and the number of rotations. In the present embodiment, under a specified load on the motor, the optimum number of rotations is calculated so as to have a target advanced angle state. Each time the change of the encoder signal is detected, the drive frequency is set to achieve advance angle control in accordance with the number of rotation that has been calculated. In the example shown in the graph D in FIG. 23, the deviation of 70 occurs at the timing of Enc0Down. If the table number changes from 120 to 190 at once in the sine wave generator 109, harmonics are included in the drive voltage waveform to cause noise and uneven rotation. Additionally, the load on the motor and the number of rotations determines the advance angle state, and thus, the frequency itself of the drive voltage waveform does not change even if the table number is skipped, and is thereby unable to stably maintain the state of the advance angle of 90 degrees. In the present embodiment, in order to perform advance control while maintaining a smooth drive energization waveform, the following process is performed.

In FIG. 23, timing at Enc0Down is referred to as t2 and each timing at which the ENC signal had changed in the past before t2 is referred to as t1 and t0. T0 represents time between the signal change that is one before timing t0 and t0, T1 represents time between t0 and t1, and T2 represents time between t1 and t2. Each of times T0, T1, and T2, is the time taken when the rotor magnet 119 moves at a 90 degree electrical angle, and each reciprocal thereof can equivalently be treated as a speed. At this time, the processing that estimates time T3, which is the time taken for the next finishing of the rotation of the rotor magnet 119 at the electrical angle of 90 degrees, is performed. For example, if the rotating state is substantially a constant speed rotation, the moving time T2 with the last electrical angle of 90 degrees is treated as equivalent to T3, estimated as a T3=T2. However, because the motor is in an accelerated state during the period of time immediately after the start of rotation until a stationary state speed is reached, the estimated value of time T3 is calculated based on the history of the ENC signal cycle count value in the past. The example of the estimation processing of the speed will be described with reference to FIG. 24.

Figure 24:
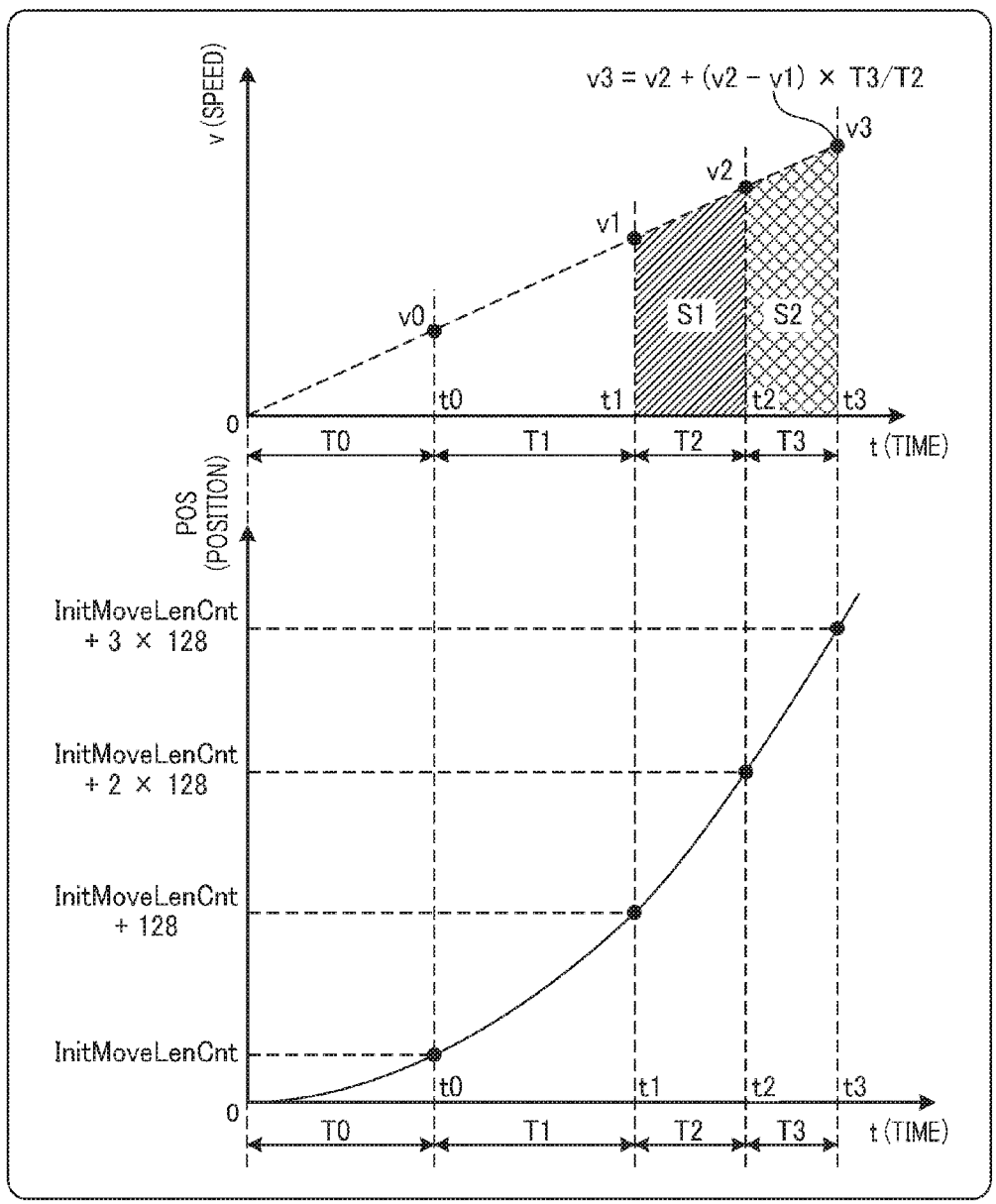
FIG. 24 is a diagram illustrating calculation processing of moving time in the second embodiment.

FIG. 24 illustrates a case of a constant acceleration motion. The graph shown in the upper part of the drawing illustrates time/speed, indicating a temporal change in speed. The graph shown in the lower part of the drawing illustrates the relation between time and a moving distance, indicating a temporal change in the moving distance. Except for T0, the rotation amount in each time T1, T2, and T3 is the amount corresponding to the next electrical angle of 90 degrees of the rotor magnet 119, each of which is uniformly same. Thus, areas S1 and S2 shown in FIG. 24 are a speed integral value and also a movement amount, that is, S1=S2. From this relation formula, the quadratic formula of time T3, including time T1, T2, and T3, and each speed of v1 and v2 at timing t1 and t2, can be obtained, and as a result for solving this formula, the formula that derives time T3 from time T1 and T2 and the speed v1 and v2. Because each speed v1 and v2 is proportional to each reciprocal of time T1 and T2, T3 can be calculated from T1 and T2. T1 is replaced by $T_{n-2}$, T2 is replaced by $T_{n-1}$, and T3 is replaced by $T_n$, and the general formula 1 is shown below.

$$T_n = \frac{-T_{n-2} + \sqrt{2 \times T_{n-2}^2 - T_{n-1}^2}}{T_{n-2} - T_{n-1}} \times T_{n-1} \quad \text{[Formula 1]}$$

During motor acceleration, the time before the next rotation of the rotor magnet 119 by an electrical angle of 90 degrees can be estimated by using the formula 1. In the formula 1, which is derived on the assumption that the acceleration is fixed, the calculation of a square root is necessary, and if the processing load on the calculation needs to be reduced, the time may be estimated using the following formula 2.

$$T_n = \frac{T_{n-2} \times T_{n-1}}{2 \times T_{n-2} - T_{n-1}} \quad \text{[Formula 2]}$$

In the formula 2, the approximation "$v_n = v_{n-1} + (v_{n-1} - v_{n-2})$", that is, the speed $v_n$ is calculated from the detection speed $v_{n-1}$, which is one unit time before $v_n$, and the detection speed $v_{n-2}$, which is two units time before. Each speed $v_n$, $v_{n-1}$, and $v_{n-2}$ is proportional to each reciprocal of $T_n$, $T_{n-1}$, and $T_{n-2}$ corresponding to the time of the detection cycle, and thus the formula 2 is derived.

In the state of the advance angle of 90 degrees shown in the graph C in FIG. 23, the table number that is obtained at a timing at which the rotor magnet 119 rotates by a 90 degree electrical angle from the timing of Enc0Down becomes 190+128=318. Additionally, this timing is the time when the estimated time T3 has elapsed from the timing of Enc0Down. In this case, the drive waveform cycle of frequency at which a moving amount corresponding to the table number of 318−120=198 advances in the estimated time T3 is set at the timing of Enc0Down. This process allows obtaining the drive energization waveform shown in the paragraph E in FIG. 23. In this case, at the timing of Enc0Down, the table number of 120, which is different in the value to be obtained in the state of the advance angle of 90 degrees, is obtained. At the elapsed timing of the estimated time T3, the rotational phase of the rotor magnet 119 coincides with the table number representing the phase of the drive energization waveform. In the actual processing, in the vicinity of the elapsed timing of the estimated time T3 after the timing of Enc0Down, the Enc0Down signal is generated, and processing similar to the advance angle control is performed. After this, the processing of the advanced angle control is performed four times per one cycle of the drive energization waveform, and the rotation drive continues.

The continuation of the above-described advancement control makes the motor stably settle into the state of the advance angle of 90 degrees, and makes the cycle of the drive energization waveform stably converge. Through the above processing, while applying sine wave-shaped drive waveform to the motor, a speed according to the load on the motor is optimized under the condition of the advance value that has been set. Here, a description will return to the flowchart in FIG. 19.

The process proceeds to S1828 from S1826 or from S1827, and the CPU 108 determines whether or not the motor is currently accelerating. As the determination method, for example, a system status in which the motor is included is grasped, the time required for the acceleration is calculated, and it is determined whether or not the motor is accelerating during the elapse of the time. Alternatively, a section or the like before the speed reaches 80% of the target speed may be defined as the acceleration period, depending on the speed condition. If it is determined that the motor is not accelerating, the process proceeds to S1829, and if it is determined that the motor is accelerating, the process proceeds to S1830.

In S1829, the processing that substitutes the value of variable, CurEncQtrPrdCnt, for the variable PdctEncQtrPrdCnt, representing the estimated time for the next rotation of the rotor magnet 119 by a 90 degree electrical angle is performed. That is, the time same as previous time is set during the rotation at the constant speed. In contrast, if the motor is accelerating, the process proceeds to S1830, and it is determined whether or not the interruption by the PI signal is the first time. If the interruption by the PI signal is the first time, the process shifts to S1829. This is because information for the estimation of time shown in FIG. 24 is insufficient. If the interruption by the PI signal is the second time or a subsequent time, the process proceeds to S1831. In S1831, through the estimation processing shown in FIG. 24, the estimated time for the rotor magnet 119 to rotate next at an electric angle of 90 degrees is calculated. Time until after a quarter cycle is estimated by using the values of the variables CurEncQtrPrdCnt and PastCurEncQtrPrdCnt. The value of the estimated time is substituted for the variable PdctEncQtrPrdCnt. That is, the variable PdctEncQtrPrdCnt represents the moving time that is taken from the current timing to the next detection of the change of the position detection signal.

After S1829 or S1831, the process proceeds to S1832 of FIG. 20A. In S1832, it is determined whether or not a cause of the interruption is due to the ENC0 signal or due to the ENC1 signal. If the cause of the interruption is due to the ENC0 signal, the process proceeds to S1833, and if the cause is due to the ENC1 signal, the process proceeds to S1834. In S1833 and S1834, the determination processing that determines whether or not the signals that cause an interruption is a rise signal or a fall signal is executed. S1833 is the determination processing of Enc0Up or Enc0Down, and S1834 is the determination processing of Enc1Up or Enc1Down. The process shifts to S1835 if Enc0Up is determined, shifts to S1836 if Enc0Down is determined, shifts to S1837 if Enc1Up is determined, or shifts to S1838 if Enc1Down is determined.

In each of S1835, S1836, S1837, and S1838, the optimal table number to be obtained at the current timing is selected if the advance angle is 90 degrees, and the processing that substitutes the value for the variable, TrgtSameTimeTblNum, is executed. For example, in S1835, the value of the variable TrgtSameTimeTableNumForEnc0Up, is substituted for the variable TrgtSameTimeTableNum. In the subsequent S1839, the CPU 108 determines whether or not the current rotation direction is in the forward rotation direction (CW) or the reverse rotation direction (CCW). If the rotation direction is in the forward rotation direction, the process proceeds to S1840, and if it is in the reverse rotation direction, the process proceeds to S1841.

In S1840 and S1841, the table number to be advanced to before the timing when the estimated time for the next rotation of the rotor magnet 119 by a 90 degree electrical angle from the current time is calculated. This number is obtained by adding the difference value between the table number value that should have been obtained at the current time and the table number value that has actually been obtained to 128, which is a table number corresponding to a quarter cycle. Specifically, in S1840, (TrgtSameTimeTableNum−CurTblNum)+128 is calculated, and the result value is substituted for the variable, TblCntForNextQtrPhs. Additionally, in S1841, the advancing direction of the table number is the opposite, (CurTblNum−TrgtSameTimeTableNum)+128 is calculated, and the result value is substituted for the variable TblCntForNextQtrPhs.

Figure 25:
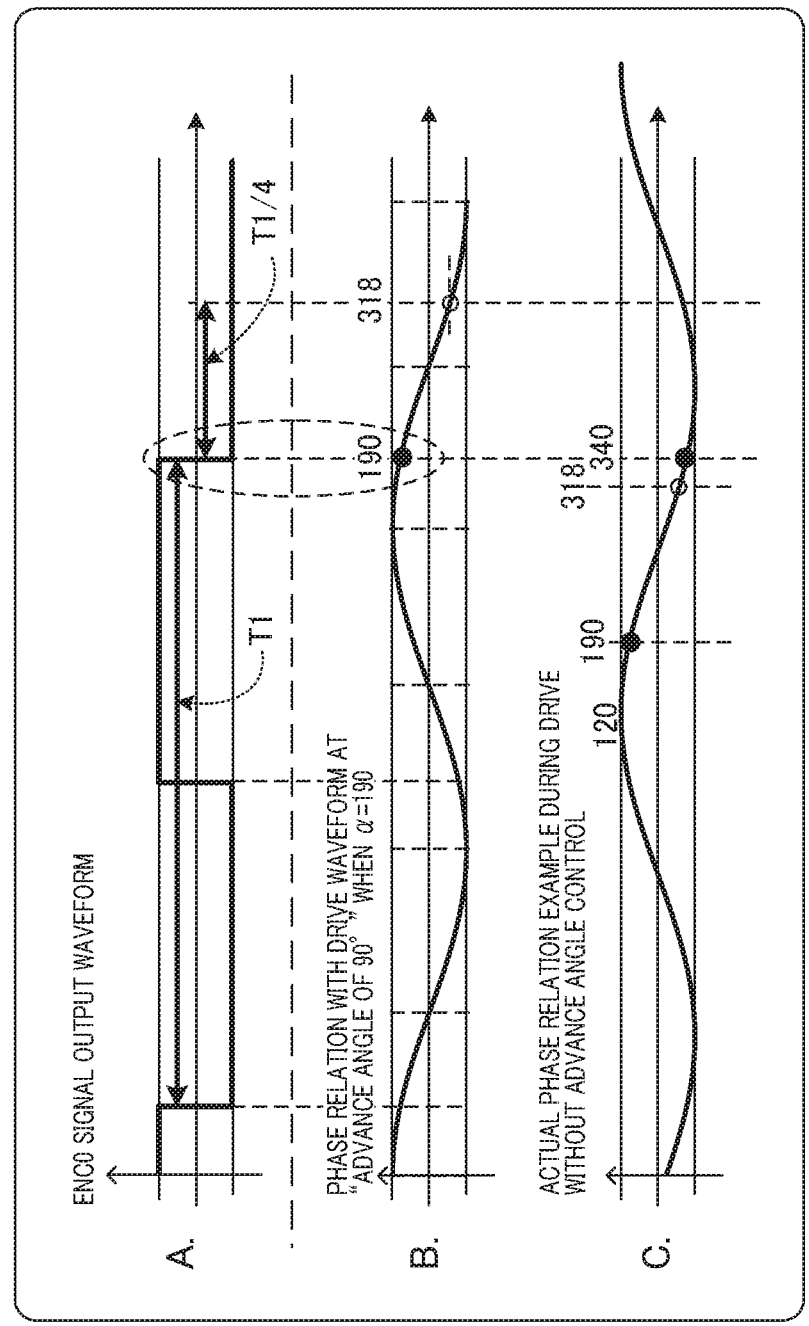
FIG. 25 is a diagram illustrating an unstable rotating state of the motor.

After S1840 or S1841, in S1842, it is checked whether or not the table number to be advanced to before the time at which the time of the variable PdctEncQtrPrdCnt has elapsed after the current timing is a negative value. A description will be given of a case in which the value of the table number in which the variable TblCntForNextQtrPhs indicates is a negative value, with reference to FIG. 25. A graph A in FIG. 25 shows an output waveform of the ENC0 signal, and a graph B in FIG. 25 is the same as the graph C in FIG. 23. A graph C in FIG. 25 illustrates an actual waveform during the drive in a case in which the advanced angle control is not performed.

Figure 20B:
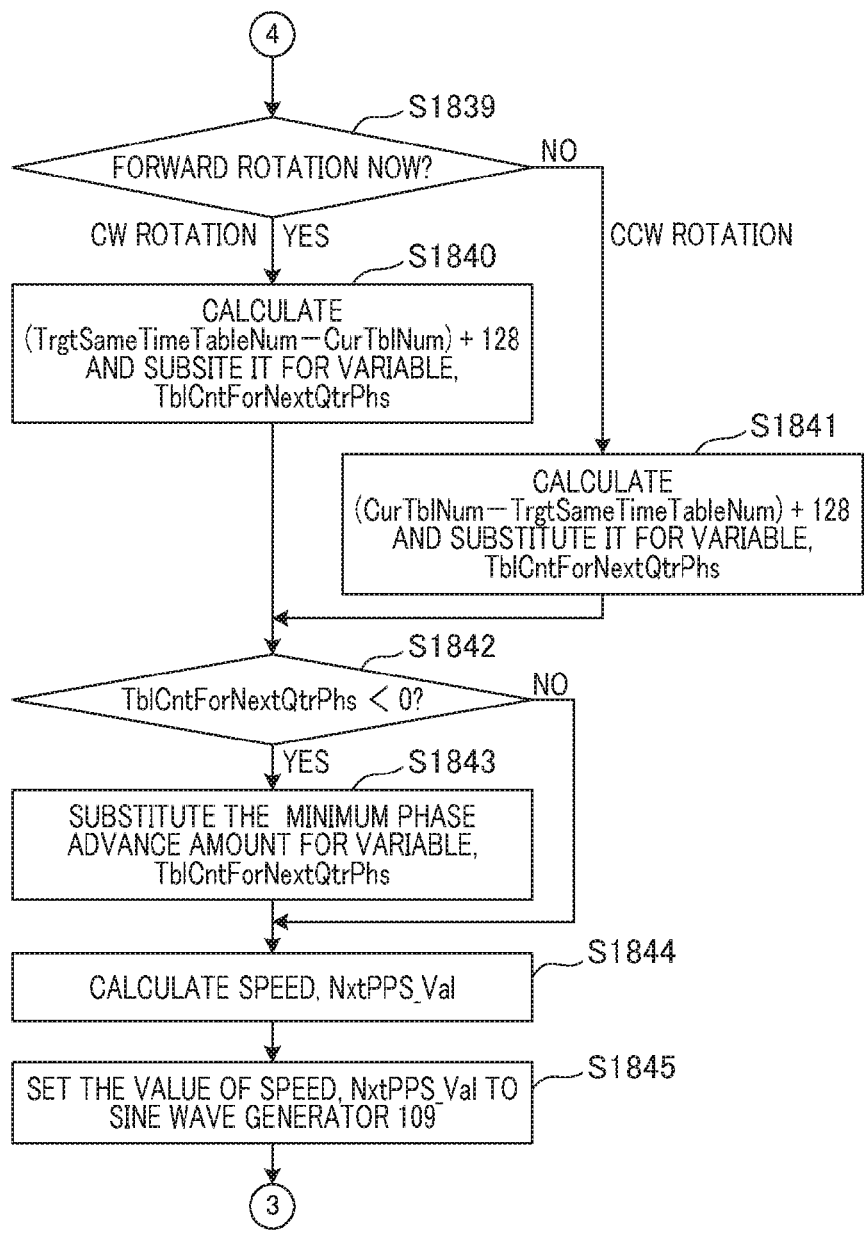

The graph C in FIG. 25 illustrates a case in which the table number to be advanced to from the current timing to the timing at which time of the variable PdctEncQtrPrdCnt has elapsed is a negative value in S1842 of FIG. 20B. In this example, 340 is obtained at the timing of Enc0Down. That is, compared with the table number 318 to be obtained at the timing after the elapse of time of variable PdctEncQtrPrdCnt, the table number to be advanced to (amount of change) is 318−340=−22. In order to avoid such a negative value, in S1843 of FIG. 20B, setting processing that substitutes the minimum phase advance amount that has been determined in advance for the variable TblCntForNextQtrPhs is performed. That is the minimum phase advance amount is set as a table number to be advanced before the elapse of time of the subsequent variable PdctEncQtrPrdCnt. Such a situation does not occur unless the advance angle state is 0 degrees or less, and hardly occurs in normal rotation operation. For example, such a situation may occur if an unusual load is applied to the motor, or if an irregularity in the load or an irregularity in the rotation is large. Note that as an alternative to the present embodiment, if the value of the table number to be advanced before the elapse of time of the variable PdctEncQtrPrdCnt becomes a negative value, the processing that sets a constant speed value determined in advance in S1843 is performed.

In the subsequent S1844, the processing that calculates the value of the speed NxtPPS_Val related to the drive voltage waveform to be subsequently set is performed. The speed is calculated from the table number to be advanced before the elapse of time of the variable PdctEncQtrPrdCnt (variable TblCntForNextQtrPhs), the calculated value of variable PdctEncQtrPrdCnt, and a conversion coefficient for converting to the actual rotational speed. Specifically, serving as the well-known value of the conversion coefficient, Conversion_Rate, to the rotational speed, the speed NxtPPS_Val is calculated from the following formula:

$$\text{NxtPPS\_Val} = (\text{TblCntForNextQtrPhs}/\text{PdctEncQrtPrdCnt}) \times \text{Conversion\_Rate}$$

In the subsequent S1845, the speed value calculated in S1844 is set to the sine wave generator 109. Subsequently, the process returns to the process of S1821 in FIG. 19.

In the present embodiment, the processing that calculates the moving time taken before the detection timing of the change of the position detection signal for the first time from the drive start timing after the stop of the motor and an initial moving amount thereof is performed, and the initial speed when the position detection signal changes for the first time is calculated. Thus, the inconvenience in which speed information cannot be obtained unless the position detection signal is accepted twice or more is resolved, and efficient drive control by precise advance angle control processing (including the acceleration control) is allowed.

According to the present embodiment, the control that rotates the motor while maintaining a phase relation in which the magnetization phase of the rotor magnet and the phase of the drive voltage waveform are specified. At the start of the drive of the motor, the drive control that further increases acceleration torque is allowed, and the operation upon the start of the drive is improved.

[Other Embodiments]

In the above embodiments, although the stepping motor has been illustrated, the invention can be implemented even if applied to a brushless DC motor or the like. Additionally, in the above embodiments, the slit rotation plate is attached to the shaft of the stepping motor and the position detection is performed by using a photo-interrupter. Not limited to this, a detection unit that detects the position of the motor shaft or a unit to be detected attached to the motor shaft may be provided. For example, it may be possible that a magnet that is the unit to be detected is attached to the motor shaft and this magnet is detected by a magnetic sensor. Additionally, it may be possible that a magnetic sensor may be disposed at a position at which the magnetization phase of the rotor magnet is directly detected and the detection of the position is performed.

In the above embodiments, the configuration in which the magnet is arranged at the rotor side and the coil that enables voltage excitation is arranged at the stator side is shown. That is, the motor includes the stator with a plurality of phases in which the magnetic poles change by applying a voltage signal, and the rotor having the magnetic poles with the number of phases corresponding to the number of the stators. Not limited to this, the present embodiment can be implemented even in the opposite configuration (the electromagnetic coil is arranged at the rotor side and magnet is arranged at the stator side). Additionally, an example in which, upon the start of the rotation, the phase corresponding to the position upon the stop is changed to the phase that is advanced to at 90 degrees by sine wave drive and the rotation starts was described. The value of the phase angle of 90 degrees is an example, and in place of this, if the correction value taking into consideration the current delay to the voltage and the environment response for such as noise and the like is β, 90 degrees+β, or 90 degrees−β may be used as a set value.

While the invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-062970, filed Mar. 25, 2015 which is hereby incorporated by reference wherein in its entirety.

What is claimed is:

1. A motor control device that performs drive control of a motor comprising:
    an obtaining unit that is configured to obtain a position detection signal by which the output periodically changes due to a movement of a movable element of the motor; and
    a control unit that is configured to supply a drive signal to the motor,
    wherein, the control unit has a first mode for supplying a drive signal that is advanced by the amount of the advance angle that has been set to a value other than 0 degree in advance to the motor, and a second mode for supplying a drive signal by which the amount of the advance angle is controlled based on the position detection signal obtained by the obtaining unit to the motor,
    wherein, when the drive signal is supplied and a period of time from the motor stopping to the change of the position detection signal obtained by the obtaining unit, the control unit supplies the drive signal to the motor in the first mode, and
    wherein, after the position detection signal obtained by the obtaining unit changes, the control unit supplies drive signal to the motor in the second mode.

2. The motor control device according to claim 1, wherein, during the period, of tine from the motor stopping to the change of the position detection signal, the control unit supplies the drive signal to the motor based on a moving direction of the movable element of the motor in the first mode.

3. The motor control device according to claim 2, wherein, during the period of time from the motor stopping to the change of the position detection signal, the control unit supplies the drive signal based on the moving direction of the movable element of the motor to the motor such that acceleration torque of the motor becomes maximum in the first mode.

4. The motor control device according to claim 2, wherein the advance angle that has been set in advance is a 90 degree electrical angle.

5. The motor control device according to claim 1, wherein the control unit determines a moving amount of the movable element during the period of time from the motor stopping to the change of the position detection signal for the first time based on the drive signal supplied to the motor in a state in which the motor stops, measures time from the motor stopping to the change of the position detection signal for the first time obtained by the obtaining unit, determines a first speed of the movable element during the change of the position detection signal for the first time, and supplies a drive signal by which the amount of the advance angle is controlled based on the first speed to the motor.

6. The motor control device according to claim 5, wherein, after the change of the position detection signal obtained by the obtaining unit for the second time or the subsequent times, the control unit measures time from the latest change to the next change of the position detection signal, determines a second speed of the movable element during the next change of the position detection signal, and supplies the drive signal by which the amount of the advance angle is controlled based on the second speed to the motor.

7. The motor control device according to claim 1, wherein the control unit supplies a sine wave drive signal to the motor.

8. The motor control device according to claim 1, wherein the control unit obtains a current position based on the drive signal when the motor is stopped, and performs the first mode based on the current position depending on the drive signal.

9. The motor control device according to claim 1, wherein the control unit supplies a wave drive signal to the motor, and performs the first mode based on information indicating a relationship between a plurality of positions in one period of a sine wave and a pulse width modulation value, and the current position depending on the drive signal.

10. The motor control device according to claim 1, wherein the control unit determines a first speed of the moable element during the change of the position detection signal for the first time based on a moving amount of the movable element during a period of time from the motor stopping to the change of the position detection signal for the first time and time from the motor stopping to the change of the position detection signal for the first time that has been obtained by the obtaining unit, and supplies the drive signal by which the amount of the advance angle is controlled based on the first speed to the motor.

11. The motor control device according to claim 1, wherein the control unit switches a mode for supplying the drive signal to the motor from the first mode to the second mode based on the acquisition of the position detection signal by the obtaining unit.

12. A motor control device that performs drive control of a motor comprising:
    an obtaining unit that is configured to obtain a position detection signal by which the output periodically changes due to a movement of a movable element of the motor; and
    a control unit that is configured to supply a drive signal by which an amount of an advance angle is controlled based on the position detection signal obtained by the obtaining unit to the motor,
    wherein the control unit determines a moving amount of he movable element during a period of time froze the motor stopping to the change of the position detection signal for the first time, based on the drive signal supplied to the motor in a state in which the motor stops, measures time from the motor stopping to the change of the position detection signal for the first time obtained by the obtaining unit, determines a first speed of the movable element during the change of the position detection signal for the first time, and supplies a drive signal by which the amount of the advance angle is controlled based on the first speed to the motor.

13. The motor control device according to claim 12, wherein, after the change of the position detection signal obtained by the obtaining unit for the second time or the subsequent times, the control unit measures time from the latest change to the next change of the position detection signal, determines a second speed of the movable element during the next change of the position detection signal, and supplies a drive signal by which the amount of the advance angle is controlled based on the second speed to the motor.

14. A motor control method for obtaining a position detection signal by which the output periodically changes due to a movement of a movable element of a motor, and supplying a drive signal to the motor, the method comprising:
   supplying, in a first mode, the drive signal that is advanced by the amount of the advance angle that has been set to a value other than 0 degree in advance,
   supplying, in a second mode, a drive signal by which the amount of the advance angle is controlled based on the position detection signal to the motor,
   performing the first mode, when the drive signal is supplied and a period of from the motor stopping to the change of the position detection signal, and
   performing the second mode after the position detection signal changes.

15. A motor control method for obtaining a position detection signal by which the output changes periodically due to a movement of a movable element of a motor, and supplying a drive signal by which an advance angle amount is controlled based on the position detection signal that has been obtained to the motor, the method comprising:
   determining a moving amount of the movable element during a period of time from the motor stopping to the change of the position detection signal for the first time based on the drive signal supplied to the motor in a state in which the motor stops,
   measuring time from the motor stopping to the change of the position detection signal for the first time that has been obtained,
   determining a first speed of the movable element during the change of the position detection signal for the first time, and
   supplying a drive signal by which the amount of the advance angle is controlled based on the first speed to the motor.

16. A motor control device that performs drive control of a motor comprising:
   an obtaining unit that is configured to obtain a position detection signal by which the output periodically changes due to a movement of a movable element of the motor; and
   a control unit that is configured to supply a drive signal by which an amount of an advance angle is controlled based on the position detection signal obtained by the obtaining unit to the motor,
   wherein, during a period of time from the motor stopping to the change of the position detection signal obtained by the obtaining unit after the supply of the drive signal, the control unit supplies the drive signal that is advanced by the amount of the advance angle that has been set in advance based on a moving direction of the movable element of the motor such that acceleration torque of the motor becomes maximum to the motor, and after the position detection signal obtained by the obtaining unit changes, the control unit supplies a drive signal by which the amount of the advance angle is controlled based on the position detection signal to the motor.

* * * * *